United States Patent [19]

Bingham et al.

[11] Patent Number: 4,919,477

[45] Date of Patent: Apr. 24, 1990

[54] COMPACT PIZZA PREPARATION AND DELIVERY VEHICLE

[75] Inventors: Lynn R. Bingham, Tulsa, Okla.; Jerome R. Henke, Rose Hill, Kans.

[73] Assignee: Pizza Hut, Inc., Wichita, Kans.

[21] Appl. No.: 258,969

[22] Filed: Oct. 17, 1988

[51] Int. Cl.⁵ .............................................. B60P 3/00
[52] U.S. Cl. .................... 296/24.1; 296/22; 99/357; 99/427; 426/523
[58] Field of Search ........................ 296/22, 24.1, 156; 99/357, 427; 426/523

[56] References Cited

U.S. PATENT DOCUMENTS

| | | | |
|---|---|---|---|
| 1,263,804 | 4/1918 | Rice | 126/268 |
| 1,263,805 | 4/1918 | Rice | 126/268 |
| 1,285,304 | 11/1918 | Merrill | 126/276 |
| 1,550,638 | 8/1925 | Taylor | 126/276 |
| 1,755,593 | 4/1930 | Cavadas | 296/32 X |
| 2,057,197 | 10/1936 | Liptay | 280/203 |
| 2,409,528 | 10/1946 | Baunach | 296/22 X |
| 2,743,955 | 5/1956 | Willson | 296/156 |
| 2,982,578 | 5/1961 | Lowe | 296/22 |
| 3,191,400 | 6/1965 | Swenson | 62/239 |
| 3,888,539 | 6/1975 | Niessner | 296/156 |
| 3,908,533 | 9/1975 | Fagerstrom et al. | 99/386 |
| 3,991,739 | 11/1976 | Hoffman | 126/268 |
| 4,154,861 | 5/1979 | Smith | 426/466 |
| 4,167,585 | 9/1979 | Caridis et al. | 426/233 |
| 4,270,319 | 6/1981 | Spasojevic | 296/22 X |
| 4,338,911 | 7/1982 | Smith | 126/21 |
| 4,377,109 | 3/1983 | Brown et al. | 99/401 |
| 4,462,383 | 7/1984 | Henke et al. | 126/21 |
| 4,471,750 | 9/1984 | Burtea | 126/21 A |
| 4,474,498 | 10/1984 | Smith | 432/144 |
| 4,520,575 | 6/1985 | Holmes et al. | 34/23 |
| 4,556,043 | 12/1985 | Bratton | 126/21 A |
| 4,556,046 | 12/1985 | Riffel et al. | 126/299 D |
| 4,576,090 | 3/1986 | Burtea | 99/443 |
| 4,620,741 | 11/1986 | Hanemayer | 296/156 X |
| 4,626,661 | 12/1986 | Henke | 219/400 |
| 4,632,836 | 12/1986 | Abbott et al. | 426/302 |
| 4,643,167 | 2/1987 | Brewer | 126/299 |
| 4,679,542 | 7/1987 | Smith et al. | 126/21 A |

FOREIGN PATENT DOCUMENTS

| | | |
|---|---|---|
| 0038250 | 10/1981 | European Pat. Off. |
| 2644070 | 4/1978 | Fed. Rep. of Germany |
| 1182691 | 6/1959 | France |
| 0605206 | 9/1978 | Switzerland |

Primary Examiner—Charles A. Marmor
Assistant Examiner—Brian L. Johnson
Attorney, Agent, or Firm—Willian Brinks Olds Hofer Gilson & Lione

[57] ABSTRACT

A compact pizza preparation and delivery vehicle is described. The vehicle is a self-propelled vehicle, such as a mini-pickup truck, having a driver's compartment with a driver's seat and a cargo compartment, preferably enclosed by a topper, behind the driver's compartment. The vehicle also includes a refrigerated case for storing pizza shells and pizza toppings in the driver's compartment which case is within access of the driver in the driver's seat. An assembly table is located on top of the refrigerated case for supporting an uncooked pizza shell while applying the pizza toppings. The vehicle further includes a pizza oven in the cargo compartment which oven is adapted and positioned so that, while sitting in the driver's seat, a driver can insert an unbaked assembled pizza into the oven and remove a baked pizza from the oven.

35 Claims, 17 Drawing Sheets

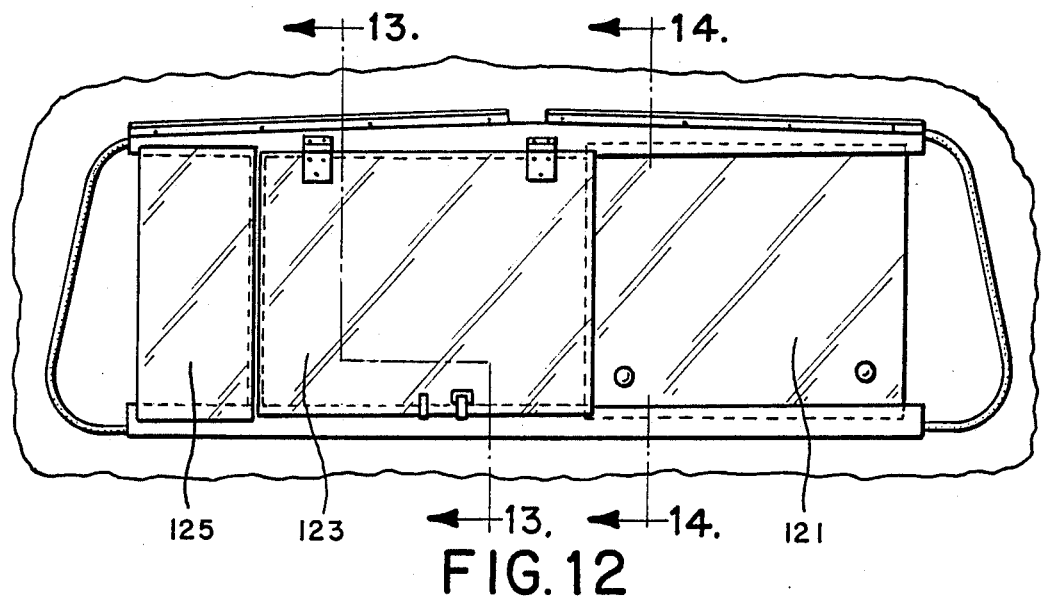
FIG. 12
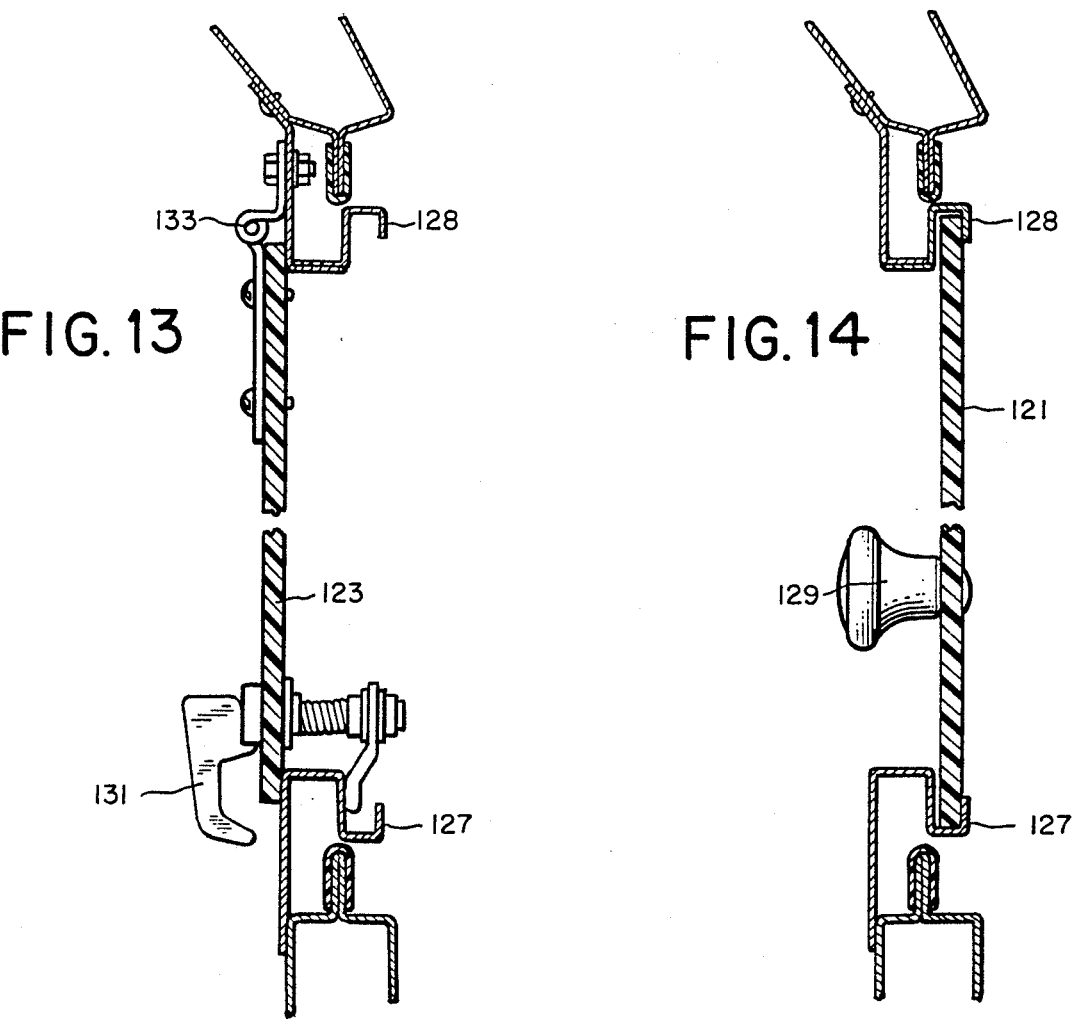
FIG. 13
FIG. 14

COMPACT PIZZA PREPARATION AND DELIVERY VEHICLE

BACKGROUND OF THE INVENTION

The present invention relates to the field of foodservice vehicles. More particularly, the invention relates to the field of vehicles for preparing and delivering pizza.

Pizza is a food product having immense popularity among consumers. Generally, consumers can obtain pizza in one of three ways' cooking their own, going to a pizza restaurant, or having a pizza cooked and then delivered Naturally, having a pizza delivered is the most convenient of the three. However, certain drawbacks do exist with the typical delivered pizza. For example, depending on the time interval between when the pizza is cooked and delivered, the pizza can often arrive in a lukewarm and soggy state with attendant loss in flavor and texture. In particular, the cheese and other toppings can undergo coagulation or other degradation upon cooling.

U.S. Pat. No. 4,632,836, to Abbott et al. and assigned to the same assignee as the present application, describes a pizza preparation and delivery system which is designed to deliver restaurant quality pizzas to the consumer's home or business. The entire disclosure of this '836 patent is incorporated herein by reference. The system described in this patent includes vehicles which were not only adapted to deliver the pizza, but also adapted to assemble and cook the pizza while in transit. Each vehicle in this system was equipped with a refrigerated case for storing pizza shells, a preparation station with pizza toppings to create an assembled pizza, and a conveyor oven for cooking the assembled pizza.

The vehicles used in the preferred embodiment described in the '836 patent were modified FORD E-350 trucks with a van type body mounted thereon. Each vehicle included a driver's station and a kitchen area. A cook's chair was put in the kitchen area and the vehicle was laid out so that, while seated in the cook's chair, the cook could reach the pizza assembly station, the oven, and the cutting table. A door was provided in the side of the van for the cook to exit the vehicle and deliver the pizza to the door of the customer. Preferably, the vehicle of the '836 patent would be manned by a driver and a cook so that the driver could drive and the cook could remain in the cook's chair to assemble, cook, box and cut pizzas. Naturally, when the vehicle of the '836 was manned by a single worker, the driver would have to find a place to park the vehicle while he moved back to the kitchen area to prepare pizzas to be cooked. Also, the lone operator would have to park in order to remove the cooked pizza from the oven.

U.S. Pat. No. 4,556,046, to Riffel et al. and also assigned to the assignee of the present invention, described an improved ventilation system for a pizza preparation and delivery vehicle such as that described in the '836 patent The entire disclosure of the '046 patent is also incorporated herein by reference.

Although the pizza preparation and delivery system described in the '836 and '046 patents enjoyed a measure of success, it was found that the purchase, operating, and maintenance costs of the relatively large vehicles used in the preferred embodiment ran higher than what was desirable.

One factor adding to these costs was the gasoline or propane fueled electric power generator which was included on the vehicles to supply the power needs of the refrigerated cases and ovens on the vehicles. Not only did this generator add to the purchase, operating, and maintenance costs of the vehicle, it also increased vehicle noise.

U.S. Pat. No. 4,643,167, to Brewer and also assigned to the assignee of the present invention, described a further improvement to the ventilation system for an oven within a pizza preparation and delivery vehicle. By the time the application for the '167 patent was filed, the preferred vehicle had been downsized to a typical full-size van, such as the FORD "Econoline". The kitchen layout was the same in the '167 patent as in the '836 and '046. That is, the new vehicle included a driver's station and a kitchen area with a cook's chair and a conveyor oven. The new vehicle also included a separate electrical generator.

Although using this smaller van resulted in a reduction of the purchase, operating, and maintenance costs, market pressures still motivated the search for a vehicle that would be less expensive to purchase, operate and maintain. In particular, it is critical to minimize the costs of this new mobile preparation and delivery system so that an operator can offer pizza at the competitive prices, while achieving the same or higher profit levels as one could achieve in a conventional pizza restaurant or delivery business.

SUMMARY OF THE INVENTION

Briefly stated, the present invention is a compact pizza preparation and delivery vehicle. The vehicle is a self-powered vehicle having a driver's compartment with a driver's seat and a cargo compartment behind the driver's compartment The vehicle also includes a refrigerated case for storing pizza shells and pizza toppings in the driver's compartment which case is within access of the driver in the driver's seat. An assembly table is located on top of the refrigerated case for supporting an uncooked pizza shell while applying the pizza toppings. The vehicle further includes a pizza oven in the cargo compartment which oven is adapted and positioned so that, while sitting in the driver's seat, a driver can insert an unbaked assembled pizza into the oven and remove a baked pizza from the oven.

In accordance with a preferred embodiment, the pizza preparation and delivery vehicle is made from a small pickup truck. In this embodiment, the cargo bed of the truck is covered with a topper. Also, the passenger seat is removed from the driver's compartment and the refrigerated case is put in its place. This preferred vehicle also includes a supplemental refrigerated case in the cargo compartment for storing extra pizza shells. The preferred oven includes a turntable on which the pizza is rotated during baking. The turntable is preferably attached to the oven door which is hinged on one side. In this way, the turntable is brought out of the baking chamber when the door is opened and is thus more accessible to the driver. In addition, the pizza is prevented from becoming over-cooked. Also in the preferred embodiment, all of the electrical power needs are met by the generator for the engine. That is, there is no need for a separate generator on the preferred vehicle The vehicle of the present invention provides significant advantages. For one thing, the development of the preferred embodiment which fits within the typical mini-pickup truck has reduced the overall purchase price of the vehicle. The cost of equipping the vehicle, as well as the noise output, are reduced when no separate electrical generator is used. The operating cost is also reduced. Comparisons have shown that the typical full-size van as described in the '167 patent to Brewer consumed about 4 gallons of gasoline per hour, while the vehicles made in accordance with the preferred embodiment consume about 1 gallon per hour.

It is noted that the term "pizza" as used in this specification and the appended claims is intended to have a relatively broad definition including traditional styles of pizza with a single crust topped with sauce, cheese, meats and/or vegetables, as well as other styles such as stuffed pizza.

Also, the terms "pickup" and "pickup truck" are intended to refer to a light truck having an enclosed driver's compartment and a cargo bed.

In addition, the phrase "in transit" is intended to refer to any time when the vehicle is away from the home base, such as en route to a delivery destination. Note that the vehicle need not be actually moving when in transit.

The present invention, together with attendant objects and advantages, will be best understood with reference to the detailed description below read in conjunction with the accompanying drawings.

BRIEF DESCRIPTION OF THE DRAWINGS

FIG. 12 is a front view of the window between the driver's compartment and the cargo compartment.

FIG. 13 is a cross-sectional view along line 13—13 of FIG. 12.

FIG. 14 is a cross-sectional view along line 14—14 of FIG. 12.

DETAILED DESCRIPTION OF THE PREFERRED EMBODIMENTS

Figure 1:
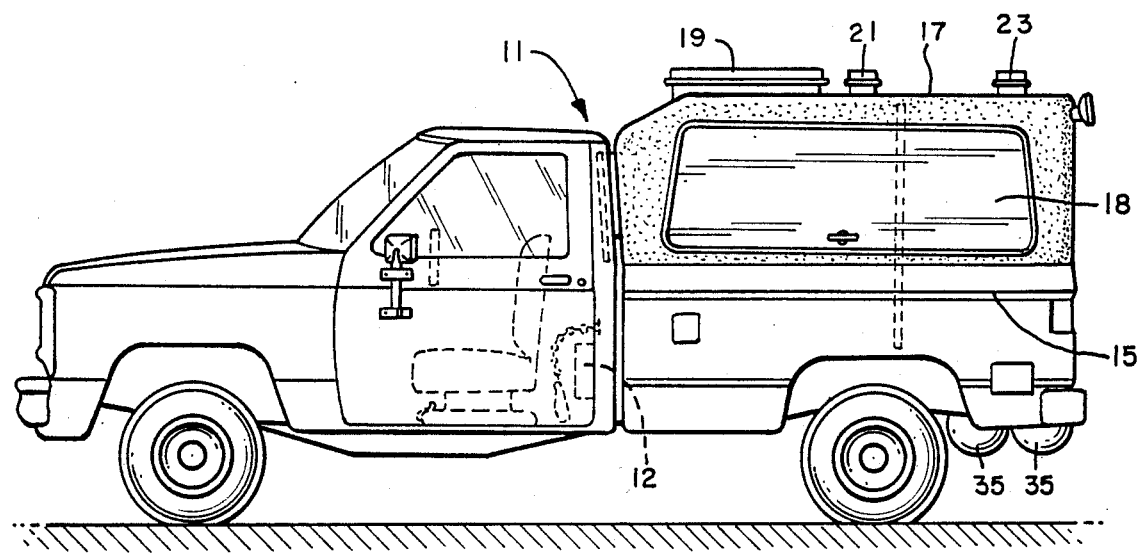
FIG. 1 is a driver's side view of the vehicle of the most preferred embodiment of the present invention.

Referring to the drawings, FIG. 1 is a view from the driver's side of the pizza preparation and delivery vehicle 11 of the most preferred embodiment of the present invention. The vehicle 11 is a pickup truck which has been modified in the ways to be described below. The pickup truck shown is a FORD Ranger model "Regular Cab 2-wheel drive". This particular truck is generally considered a "mini-pickup" as opposed to a midsize or fullsize. This pickup truck has a payload capacity of approximately 1612 pounds and a Gross Vehicle Weight Restriction (GVWR) of 4260 pounds. The cargo bed of this truck is approximately 77" long and 54" wide. The engine is a 2.3 liter 4 cylinder.

While this particular pickup truck is most preferred, other types of self-propelled vehicles may also be used. Preferably, the vehicle of the present invention will be based on a pickup truck. More preferably, the vehicle will be based on a mini-pickup truck such as the Ford Ranger described herein. Alternatively, the vehicle can be a mid-size or full-size pickup truck. Also, the vehicle could be a mini-van. An important consideration in the selection of the vehicle is the cost of purchasing, equipping, operating, and maintaining the vehicle.

Another important consideration in selecting the vehicle to be modified according to the present invention is the payload capacity and size of the cargo compartment. For efficiency sake, the vehicle of the invention is preferably designed so as to use as much of the space and payload capacity as is practicable. For example, as will be discussed below, the preferred vehicle has a dual pizza oven, i.e. two baking chambers. Also, the sizes and weights of the primary and supplemental refrigerated cases are selected so as to be as large as possible within the vehicle. Selecting a vehicle with more space and a larger payload capacity will allow for the use of larger equipment, such as a triple oven or larger refrigerated cases. At present, the depicted Ford Ranger pickup truck is most preferred because the preferred equipment can be fit into it.

This particular truck's relatively small size makes it economical to purchase, operate and maintain. The purchase price of this mini-pickup is considerably lower than that of the larger vehicles described in the three patents mentioned above. The purchase price is a particularly important factor to the feasibility of establishing a fleet of such pizza preparation and delivery vehicles.

Also, because of its small size, the mini-pickup is more economical to run. The E.P.A. quoted gas mileage figures for this truck are 22 m.p.g. in the city and 27 m.p.g. on the highway. This can be compared to the E.P.A. quoted figures of 15 m.p.g. in the city and 17 m.p.g. on the highway for the full-size van used in the '167 patent. This better gas mileage important because it lowers the average cost per pizza of operating the vehicle.

The operating cost of the vehicle of the present invention is also reduced by virtue of the fact that it is operated by a single person sitting in a single location The driver sitting in the driver's seat is able to prepare and bake pizzas.

As will be discussed more fully in connection with FIGS. 20 and 21 below, the cost of equipping a pickup truck according to the present invention is typically lower than that of equipping another vehicle such as a van.

The cost of equipping, operating and maintaining the preferred vehicle is reduced by virtue of the fact that there is no separate generator to provide electrical power for the equipment on the vehicle. The vehicles described in the three patents noted above required a separate gas operated electrical generator. Naturally, this added costs and noisiness to the vehicle.

In the preferred vehicle the oven is heated by gas. The electrical power needed for the oven, the refrigerated cases, the additional lights, as well as the ventilation, control, safety, and communications systems is supplied by the alternator of the pickup truck. In order to insure enough current, it is most preferred to replace the original alternator that comes with the FORD Ranger with a heavy duty alternator such as that sold by LESTEK MFG. under the designation #9135 P.F. This alternator is rated at 135 amps.

Another advantage of using the compact mini-pickup truck in the preferred embodiment is that it is typically easier to maneuver, e.g. back up and park, a mini-pickup than it is a full-size van. This is important because the driver will likely have to park in confined spaces when making deliveries. Experience with the vehicles of the preferred embodiment has shown that these vehicles have had fewer accidents per mile than the full-size vans shown in the '167 Brewer patent.

Figure 2:
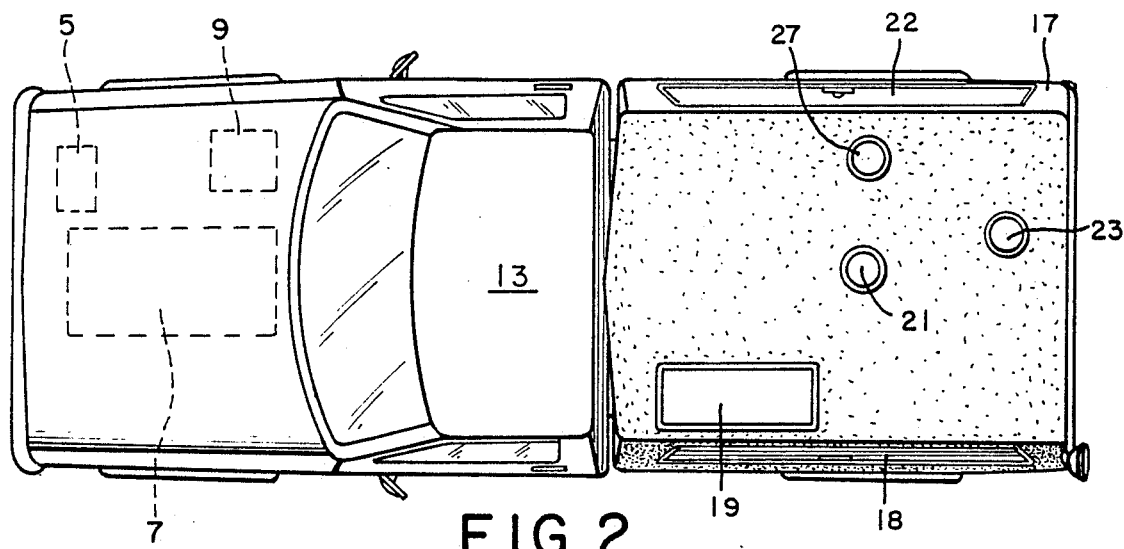
FIG. 2 is a top view of the embodiment shown in FIG. 1.
Figure 3:
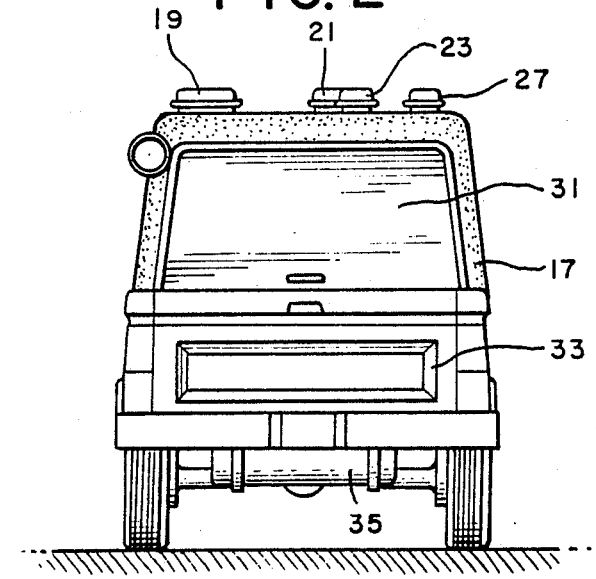
FIG. 3 is a rear view of the embodiment shown in FIG. 1.

Referring to FIGS. 1-3, the vehicle 11 includes a driver's compartment or cab 13. The vehicle also includes a cargo bed 15 with a tailgate 33. A topper 17 is mounted over the cargo bed 15 to create a cargo compartment. With the exceptions noted below, the topper 17 is an otherwise conventional topper for pick-up trucks. The particular topper shown was obtained from GUIDON CO. under the designation "RENE-GAD-II".

The topper 17 includes four doors hinged at the top and securely latched at the bottom. Door 18 is on the driver's side of the topper and provides access to the oven. Door 22 is on the passenger side of the topper and also provides access to the oven. Door 31 is at the rear of the topper and provides access to the supplemental refrigerated case.

The topper 17 also includes four ventilation ports. Port 19 is a conventional wind driven port such as that found on recreational vehicles and operates to pull air from the cargo compartment when the vehicle is in forward motion. Port 27 is driven by an electric fan. Port 21 covers the flu of the pizza oven. Port 23 allows air to be vented from the rear compartment. A positive air pressure is created in the rear compartment by the fan 142 located in the cargo bed (See FIG. 20).

Fuel tanks 35 are located underneath and near the rear of the cargo bed 15.

Figure 4:
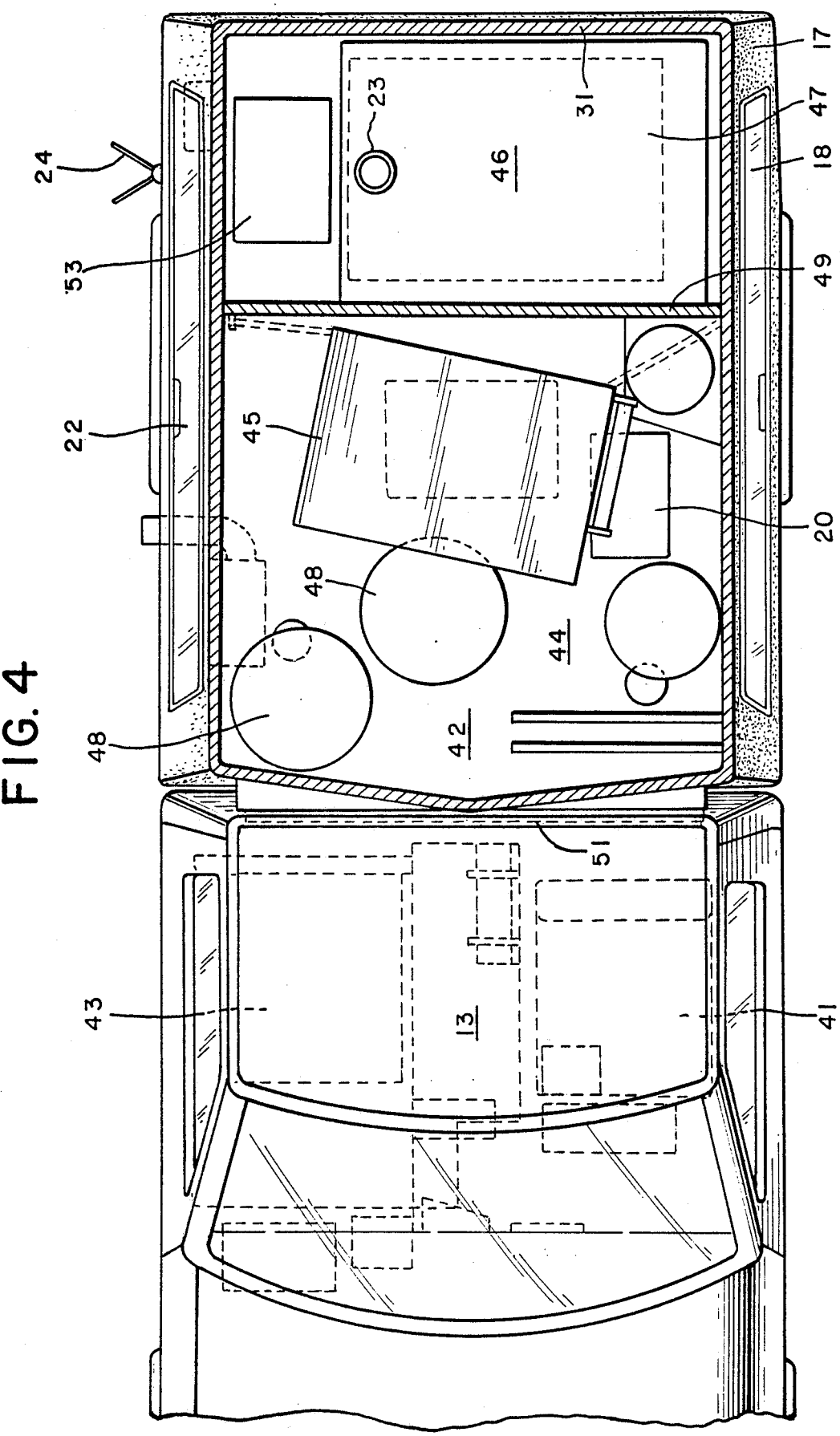
FIG. 4 is top view showing the layout of the various elements of the embodiment shown in FIG. 1.

FIG. 4 is a view intended to show the most preferred lay-out of the equipment in the vehicle 11. The cab of the pickup truck is designated as the driver's compartment 13. Within the driver's compartment is the driver's seat 41. Also within the driver's compartment is a refrigerated case 43. The cargo compartment of the vehicle is separated from the driver's compartment by window 51 (see FIGS. 12-14). A dividing wall 49 serves to separate the cargo compartment into an oven compartment 44 and a refrigerated case compartment 46. Curb feelers 24 are preferably included.

A pizza oven 45 is located in the oven compartment 44 and positioned so that the driver can insert an unbaked pizza and remove a baked pizza from the oven while sitting in the driver's seat. Further details of the oven are given below in connection with FIGS. 23-34.

A supplemental battery 20 is located in the cargo compartment. This battery is recharged by the alternator 5 for the truck engine 7. It has been found preferable to use a supplemental battery to power the equipment in the vehicle rather than using the original battery 9 from the engine. One reason for this is so that the starting of the vehicle is kept separate from the operation of the equipment on board. Most preferably, the supplemental battery is a 12 volt marine type, series 27 Exide Battery #5231.

A supplemental refrigerated case 47 is located at the rear of the cargo compartment and is thus accessible through the rear door 31 of the topper 17. Compressors 53 and 54 are also located at the rear of the cargo compartment. Preferably, the upper compressor 53 cools the supplemental refrigerated case 47, while the lower compressor 54 cools the refrigerated case in the driver's compartment 43 by means of coolant lines passing therebetween.

Figure 5:
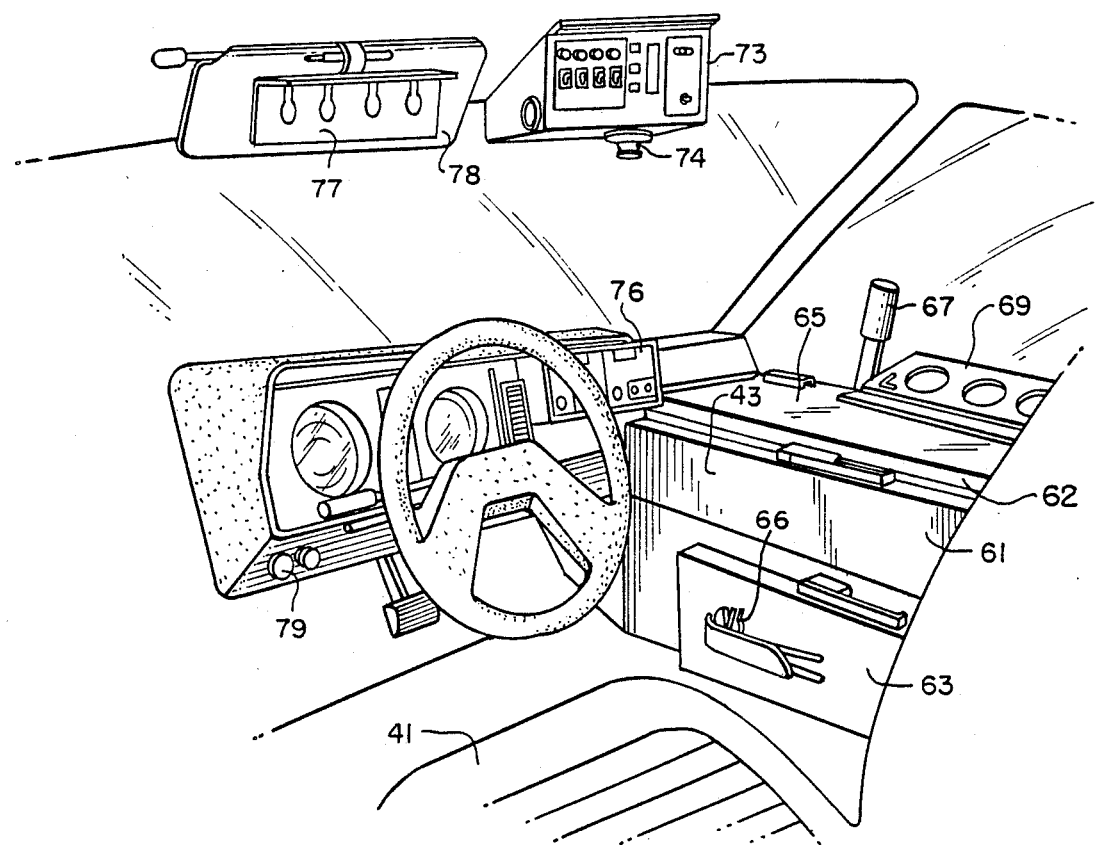
FIG. 5 is a perspective view of the interior of the driver's compartment.

FIG. 5 is a perspective view looking into the driver's compartment from the driver's door. As can be seen, the passenger's seat has been removed from the pickup truck and replaced by a refrigerated case 43 (see FIGS. 6-11). The top of the refrigerated case 43 is adapted to serve as a preparation table 65 on which the uncooked pizza shell is placed while the topping are put on. The table 65 also serves as the surface on which the baked pizza is cut and boxed.

Placing the refrigerated case 43 and the preparation table 65 in what would otherwise be the passenger's side of the cab is advantageous because it allows the driver to assemble, cut and box a pizza while sitting in the driver's seat.

Figure 9:
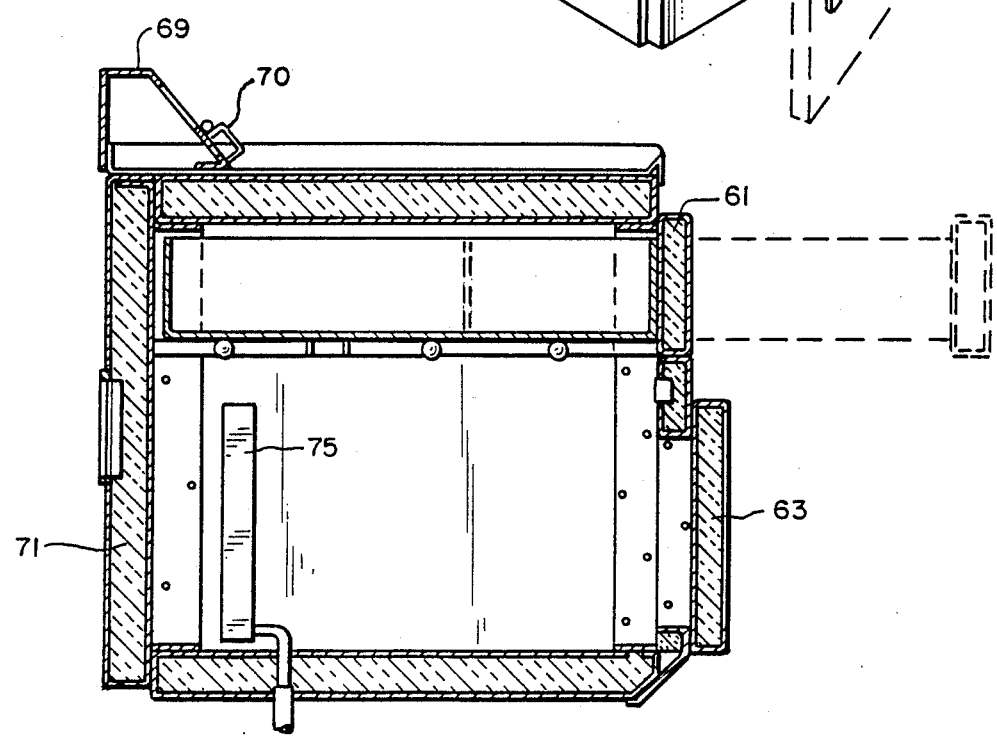
FIG. 9 is a cross-sectional view taken along line 9—9 of FIG. 7.
Figure 10:
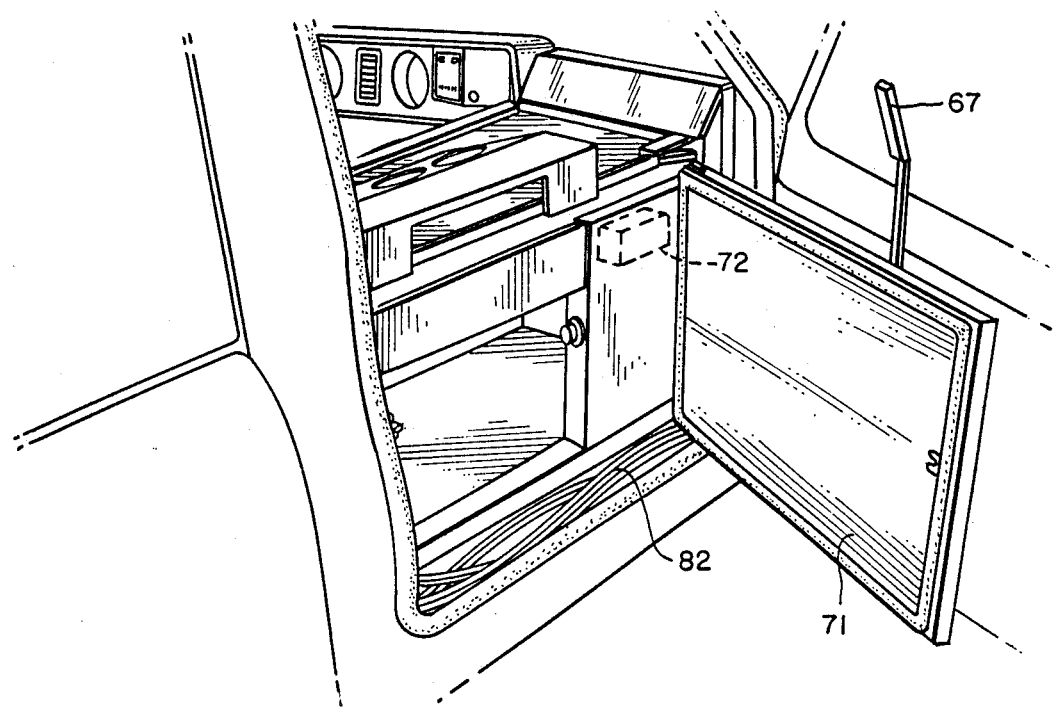
FIG. 10 is a perspective view with the passenger door and the rear door of the refrigerated case open.

Preferably, the table 65 is made so as to extend completely to the dash to avoid problems with spilling. Also, the three edges away from the driver are turned up to avoid spilling. The edge 62 nearest to the driver is preferably formed into a marine corner to avoid spilling and also to provide safety and comfort for the driver. A condiment cup rack 69 is included on top of the table 65 for holding cups 60 used for portioning the pizza toppings, e.g. cheese, beef, onions, etc. The rack is also adapted to hold a spatula 64 and a rocker knife 68 used for cutting the cooked pizzas. As seen in FIG. 9, the rack includes a spring-loaded catch 70 to securely hold the knife in place.

A door handle extension 67 has been attached to the passenger door handle so that the driver can unlock and open the passenger door in the event of an emergency to exit through the passenger door.

An electrical systems control box 73 is installed on the ceiling of the cab. This box includes switches to control the lights and the other electrical systems of the vehicle, namely the interior lights, rear spot light, safety system, oven, refrigerated cases. A volt meter monitoring for the supplemental battery system is also included within control box 73. In this way, the driver can monitor the status of the supplemental battery when the engine is turned off, and thus know when the restart the engine to recharge the supplemental battery. A working light 74 is included on the bottom of the control box 73.

An oven control box 76 is mounted on the dash. This oven control box includes the switches to operate the pizza oven of the vehicle. Because the preferred pizza oven actually includes two stacked baking units, the preferred oven controller includes identical controls for the top and the bottom baking units.

The preferred oven controller means has several functions. The primary function is to serve as an oven timer. That is, the controller means sets the proper baking cycle for the oven. This is preferably accomplished by including an electronic timer which is set at the proper time when the pizza is inserted in the oven and then counts down to zero while the pizza is being baked. When the timer reaches zero, a signal is generated. Preferably, this signal will generate an audible signal to the driver as well as a lighted indicator that the baking cycle is completed.

As described below (see FIGS. 23, 26-28), the oven doors are equipped with actuators which can automatically open the oven doors and bring the baked pizza out of the oven. Thus, in this embodiment, at the conclusion of the preset baking cycle, the oven controller means will also generate a signal to the door actuator means so that the doors are opened and the pizza is removed.

This feature of automatically removing the pizza from the oven at the conclusion of the baking cycle is highly advantageous in that it prevents the pizza from becoming overcooked if the driver is unable to stop the vehicle, or if the driver is away from the vehicle making another delivery.

Another feature of the preferred oven controller means is that it is also adapted to conserve electrical energy. The preferred oven is an impingement oven wherein heated air is impelled by high-speed fans or blowers toward the top and bottom of the pizza. The oven controller means is programmed to step up the speed of the fans to the operating speeds at the beginning of the baking cycle. At the end of the baking cycle, the fan speed is reset to an energy saving idle speed. In addition, the oven uses a powered turntable to rotate the pizza during cooking. For the same reasons, the oven controller means will preferably switch the turntable on and off to coincide with the baking cycle.

Most preferably, the oven controller means is configured so that the driver simply pushes a "door open" button to begin the baking process. In response to pushing the initial button, the door actuator opens the door of oven. The driver then places the pizza, preferably in a pan, onto the turntable of the oven. A second button, "start bake" button is pushed. In response, the oven controller generates the signal to close the door, to step up the speed of the fans, to switch the turntable on, and to begin timing the baking cycle. Most preferably, the oven controller provides a visual readout, such as by LED, of the time remaining for each baking cycle. At the conclusion of the baking cycle, the controller means generates an audible signal, such as a beep for 30 seconds, and also generates the signal to the door actuator to open the oven door.

When the oven door opens, the driver can bring the pizza in the pan into the driver's compartment by use of the pan grippers 66 The hot pizza is removed from the pan and placed on the table 65 where it will be cut and boxed. The hot and dirty pan is then passed back through the window and dropped in the pan receiving areas 48 (see FIG. 4).

The most preferred driver's compartment includes a few other special features. Mounted on the visor 78 is a order holder 77 which can be used to retain the customer pizza orders until completed. Also, a special safety button 79 is included. As explained in connection with FIG. 22, this button acts as an emergency kill switch to shut off the flow of gas from the fuel tanks. According to the preferred safety system, none of the solenoid operated valves on the fuel tanks or ovens will open unless the switch is pulled out. Naturally, this switch should be well labeled and lighted.

Figure 6:
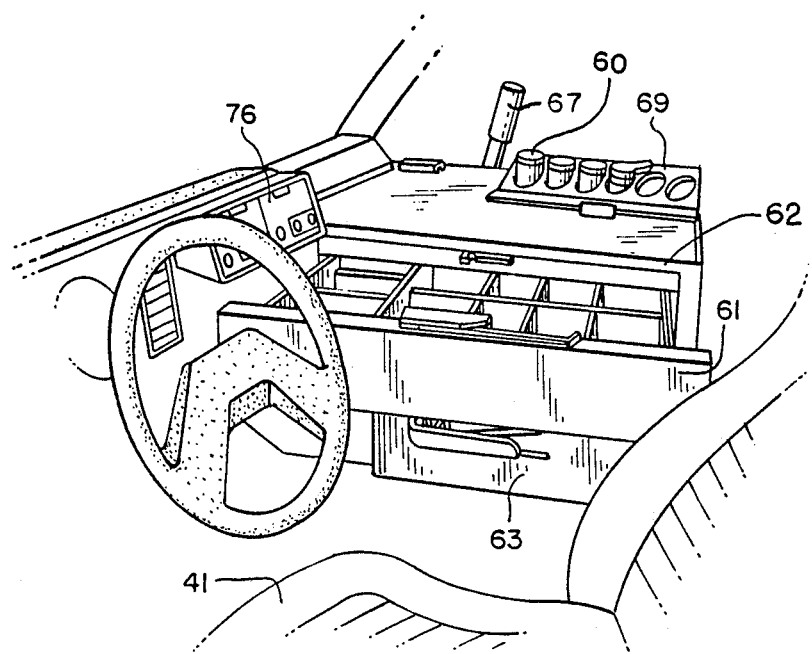
FIG. 6 is a view similar to FIG. 5 showing the toppings drawer pulled toward the driver's seat.
Figure 7:
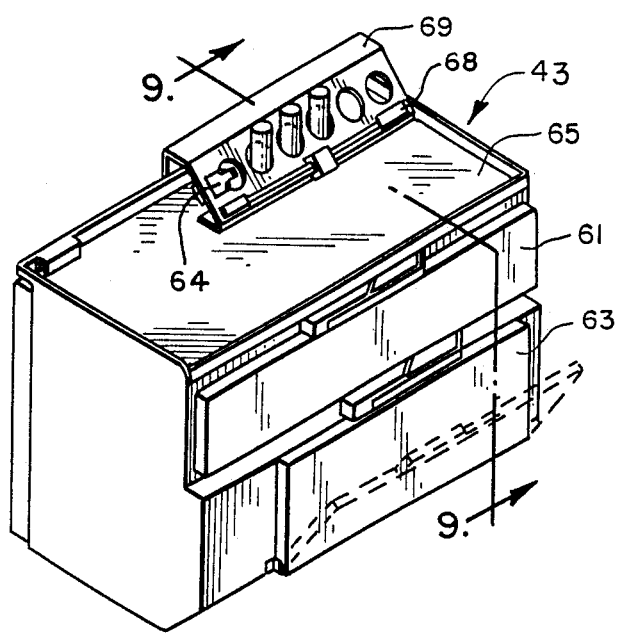
FIG. 7 is a perspective view of the top and front surfaces of the refrigerated case shown in FIG. 5.
Figure 8:
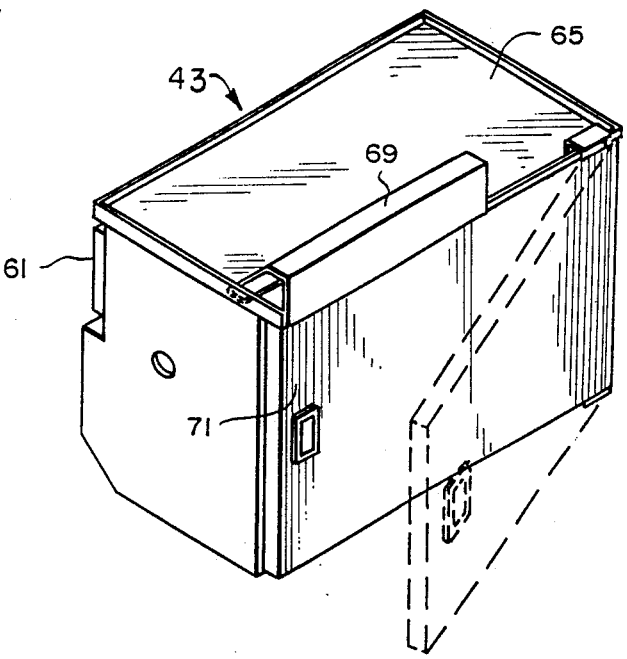
FIG. 8 is a perspective view showing the top and rear surface of the refrigerated case shown in FIG. 5.

FIGS. 6-10 illustrate the most preferred embodiment of the refrigerated case 43 in the driver's compartment. An important feature of this most preferred case 43 is that the pizza toppings are held in a drawer 61. The drawer 61 is adapted to support insert pans in order to hold and segregate different pizza toppings. Typically, the largest section is reserved to hold cheese. This drawer 61 slides in and out of the case 43. As shown in FIG. 6, when the drawer is pulled out, the toppings are brought closer to the driver for his convenience. As seen in FIG. 5, when the drawer is pushed back in, the space is freed up for the driver's safety and comfort and to allow access to the transmission shifter.

The preferred refrigerated case 43 also includes a door 63 for gaining access to the uncooked pizza shells stored therein. Approximately 7 of PIZZA HUT's "Pan Pizza ®," i.e. conventional, large pizza shells or about 13 of the PIZZA HUT's "Hand Tossed ®" pizza shells can be stored in the refrigerated case 43. In addition, bags of extra toppings and 3 six-packs of canned PEPSI ® can also be fit into the case 43. The preferred case 43 also includes a rear access door 71 which can be opened when the passenger door is opened. This rear door 71 provides convenient access to the case when filling it with uncooked pizza shells. The rear door 71 also provides access to the cooling plates 75 which are fed by cooling lines 82. The cooling plates 75 for this case 43 are conventional plates such as those sold by NORCOLD under the designation "80 Watt." The compressor is adjusted to maintain a temperature of about 38°-40° F. within the case 43. A fan 72 is included within the case 43 for circulating the cooled air. Also, a door activated light is preferably included to illuminate the inside of the case 43.

Figure 11:
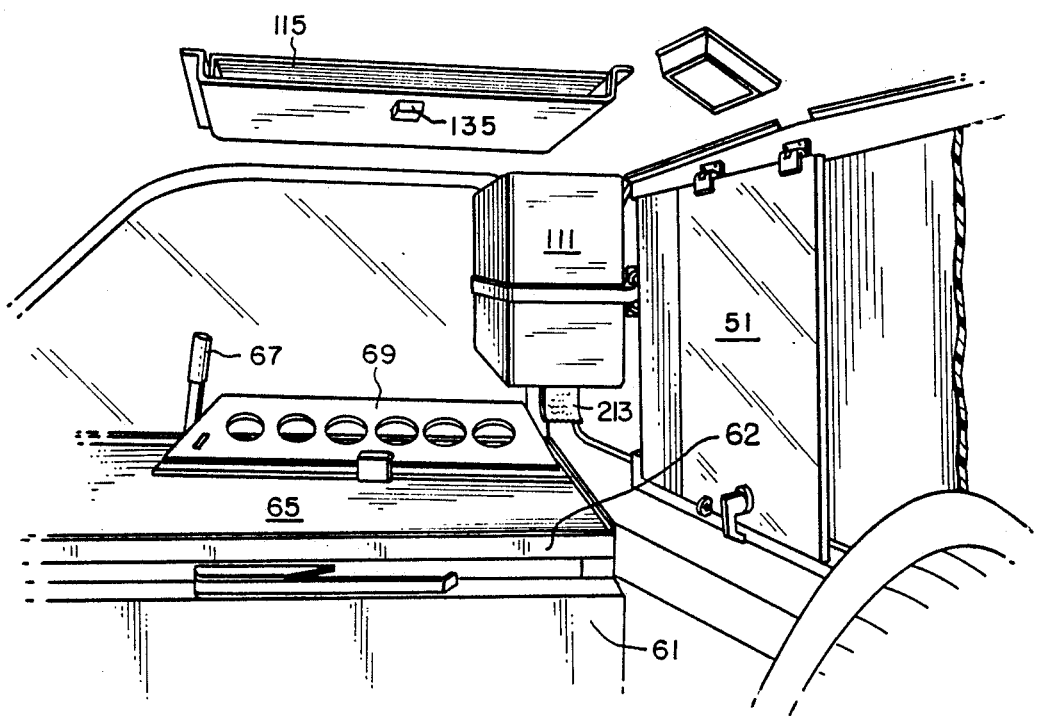
FIG. 11 is a perspective view of the interior of the driver's compartment showing the pizza preparation table.
Figure 15:
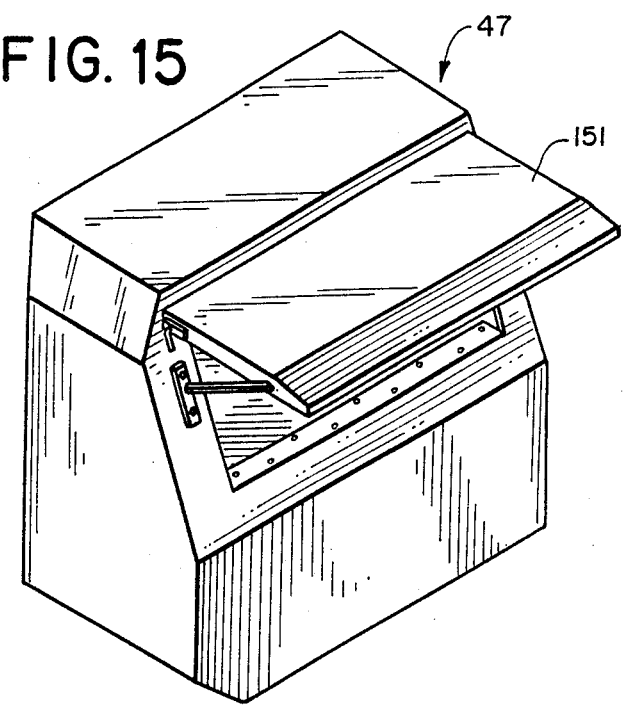
FIG. 15 is a perspective view of the supplemental refrigerated case in the cargo compartment of the vehicle shown in FIG. 1.
Figure 16:
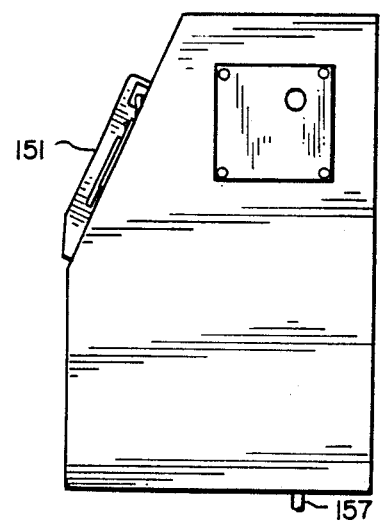
FIG. 16 is a side view of the supplemental refrigerated case shown in FIG. 15.
Figure 17:
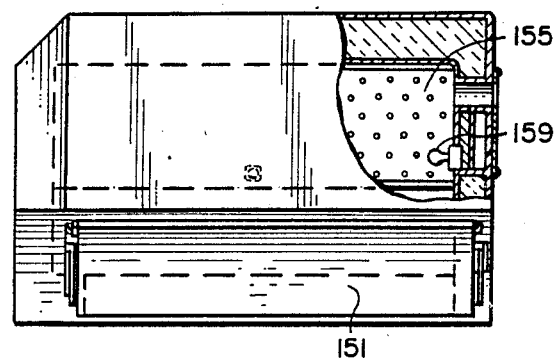
FIG. 17 is a top view of the supplemental refrigerated case shown in FIG. 15.
Figure 18:
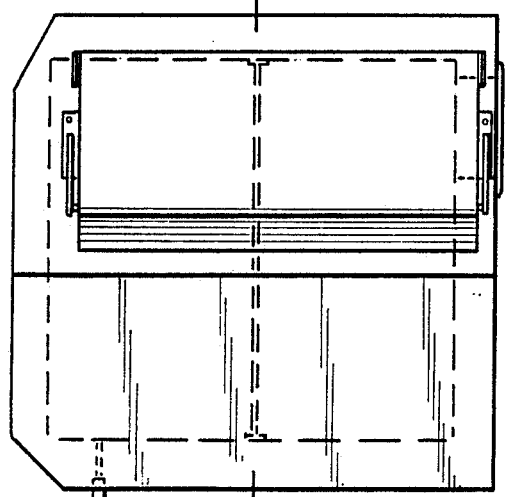
FIG. 18 is a front view of the supplemental refrigerated case shown in FIG. 15.
Figure 19:
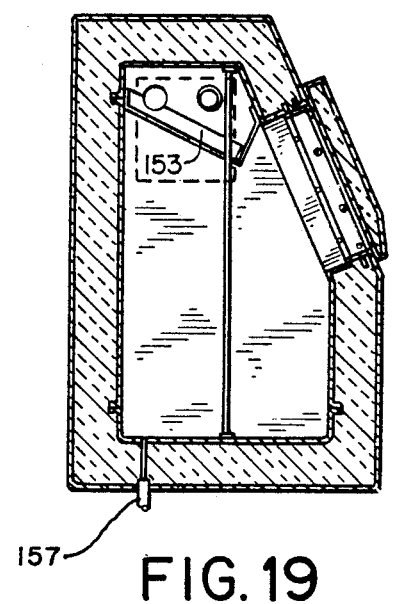
FIG. 19 is a cross-sectional view taken along lines 19—19 of FIG. 18.

FIG. 11 is another perspective view of the driver's compartment from a slightly different angle. In this view, the means for receiving pizza delivery orders 111 is shown. Basically, this unit 111 consists of a radio receiver and transmitter, a data box, a processor, and a printer. The radio is adapted to receive signals which are converted to digital data by the data box. The processor converts the digital data to the appropriate signals to drive the printer. The printer prints the delivery orders on slips of paper for the driver to read. Preferably, the delivery order will include the specifications for the ordered pizza as well as the delivery destination with directions telling the driver how to get there. Preferably, the unit 111 also includes data entry means for the driver to revise any information on the delivery order. Also, the unit 111 preferably includes means for two-way voice communication between the driver and the home station. The preferred voice communication means if a cellular phone 12 (See FIG. 1).

The preferred pizza preparation and delivery system to be used with the vehicles of the present invention is similar to that described in the three patents listed above, namely U.S. Pat. Nos. 4,632,836; 4,556,046; and 4,643,167. This preferred system includes a plurality of vehicles which work from a common home base. The home base is adapted to receive pizza delivery orders from customers. The home base then dispatches the orders to the appropriate vehicle. Preferably, the particular vehicle to receive the order is selected on the basis of its current location as well as the current inventory on the vehicle. This selection can either be made manually, or can also be made by means of a microcomputer with appropriate software and data input.

Preferably, the order is sent to the truck over the radio and converted directly into a printed delivery order ticket as described above. Alternatively, the orders can be sent over the voice communication system.

As taught in the above-numbered patents a separate commissary can be established to supply the pizza shells and toppings for the vehicles. Through experience it has been found preferable to make use of existing pizza restaurants as commissaries to supply these items. That is, it is now preferable to make arrangements at either one or more existing pizza restaurants to provide the shells and ingredients for each vehicle. On a busy night, each vehicle will preferably begin its rounds with about 40 pizza shells, 40 pounds of cheese, about 50 pounds of combined toppings, and about 42 cans of soft drinks. As taught in the '836 patent, the pizza shells are preferably covered with pizza sauce and a first layer of cheese before being loaded into the vehicle. This preparation has been found to improve the dough volume of the pizza shells during transit.

This view in FIG. 11 also shows a shelf 115 which hangs from the ceiling on the passengers side. This shelf is adapted to hold a boxed pizza while driving to the delivery destination.

FIGS. 12 and 13 illustrated the most preferred construction of the window 51 used to separate the driver's compartment from the cargo compartment. The window 51 is divided into three sections each of which are made of 0.20" thick clear polycarbonate. The section 121 immediately behind the driver's seat is adapted to slide within the tracks 127 and 128. This allows the driver to gain access to the cargo compartment immediately behind his seat. The center section 123 of the window 51 includes a hinge 133 at the top and a latch 131 at the bottom. In this way, the center section 123 can be swung upward to engage the catch 135 (see FIG. 11). As a result, the center section, the section through which the unbaked and baked pizzas will pass can be securely moved out of the way. The end section 125 is stationary.

FIGS. 15-19 illustrate the supplemental refrigerated case 47 which is preferably included with the pizza preparation and delivery vehicle in order to allow the vehicle to carry a larger supply of pizza shells and toppings than would fit in the refrigerated case in the driver's compartment. Typically, the supplemental refrigerated case 47 can be stocked with about 30 conventional or 60 hand-tossed (or combinations thereof) pizza shells, about 30 pounds of pizza cheese, and about 4 six-packs of PEPSI®. As shown in FIGS. 4 and 21, the preferred location for this supplemental refrigerated case 47 is at the rear of the cargo compartment. Access to the door 151 of the case is had through the rear door 31 of the topper 17. The case 47 is cooled by cooling plates 155 which are supplied with coolant by the upper compressor 53. A shelf 153 is included in the case 47 to hold extra toppings. A door-activated light bulb 159 is preferably included. A drain tube 157 is also preferably included to allow condensation to drain from the case.

Figure 20:
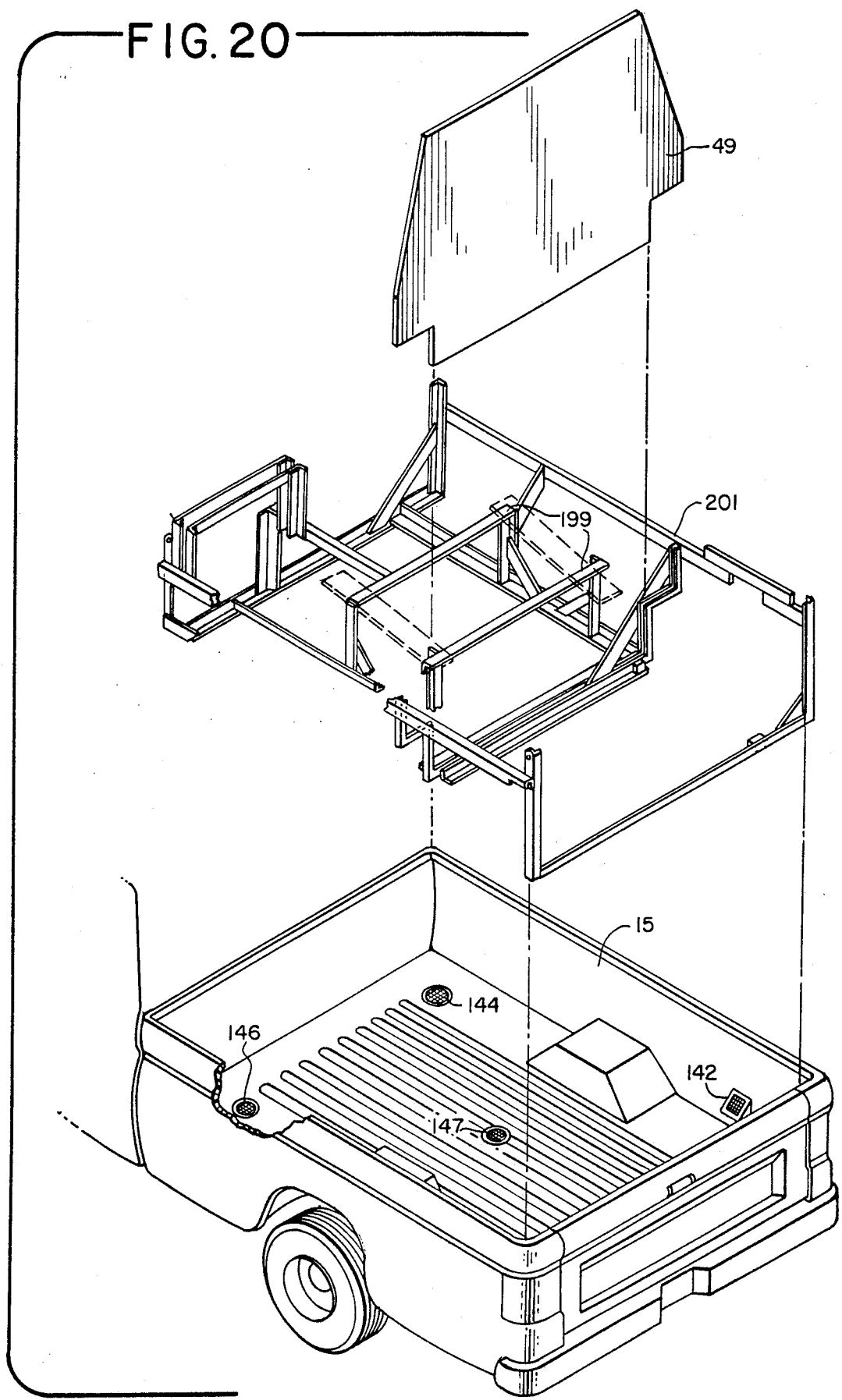
FIG. 20 is an exploded view showing how the support frame and dividing wall fit in the cargo bed of the vehicle shown in FIG. 1.

FIG. 20 is a perspective view of the frame member 201 on which the various pieces of equipment in the cargo compartment are preferably mounted. As can be seen in FIG. 20, the frame member 201 is sized so as to fit within the cargo bed 15 of the pickup truck. Most preferably, the equipment will be mounted on the frame member 201 before the frame member is inserted and attached within the cargo bed 15. The frame member 201 includes support bars 199 on which the oven is mounted. The dividing wall 49 is adapted to fit within slots in the frame member 201. The dividing wall is most preferably a 0.100" sandwich laminate of aluminum sheet on a 1.0" core of polyurethane foam.

Figure 21:
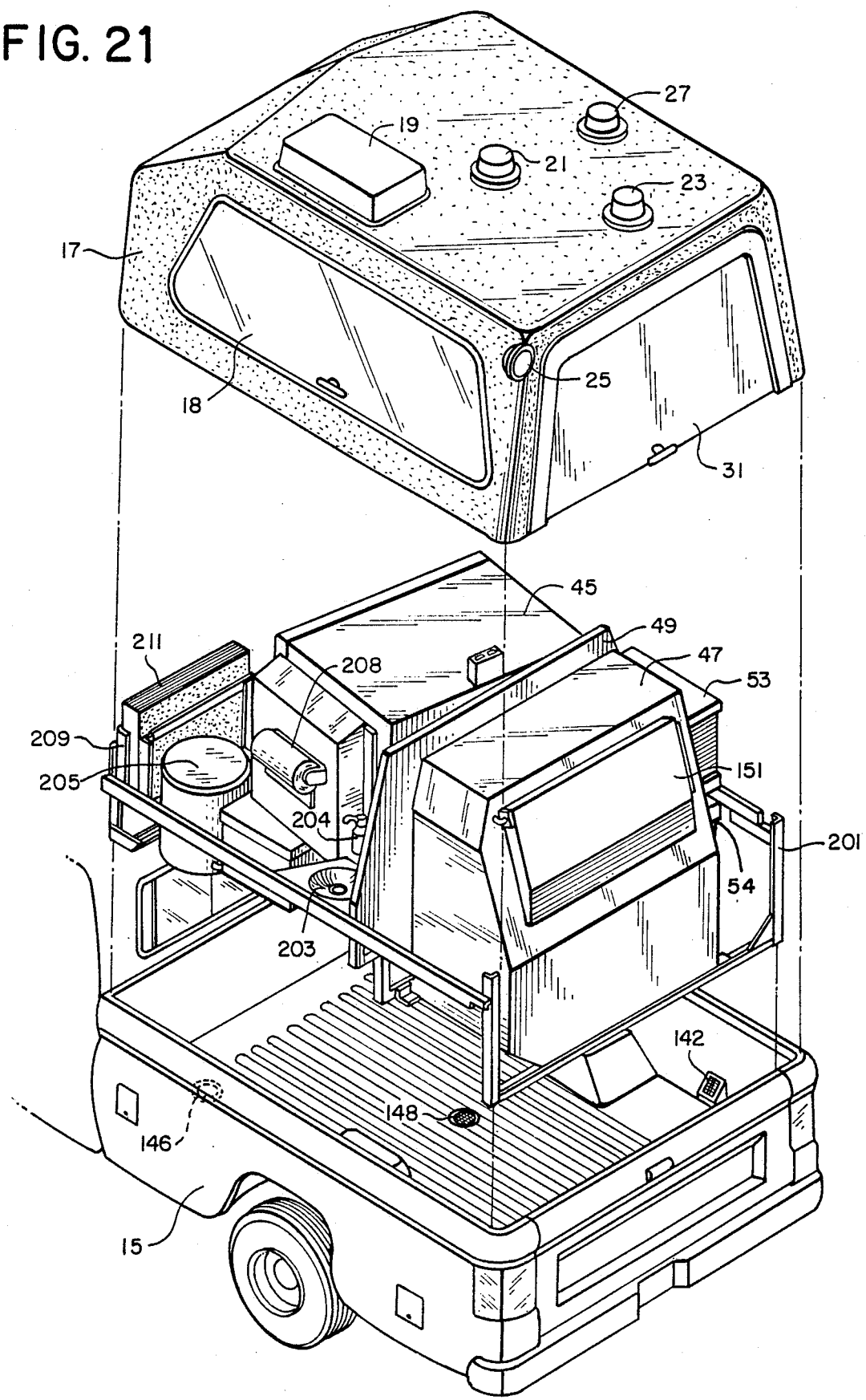
FIG. 21 is an exploded view showing the topper and the support frame with the oven and supplemental refrigerated case mounted thereon.

FIG. 21 shows the frame member 201 with the equipment mounted thereon and ready to be inserted and attached within the cargo bed 15. As can be seen, the supplemental refrigerated case 47 and the compressors are located behind the dividing wall 49. The oven 45 is mounted in front of the wall 49. Preferably, the various pieces of equipment are mounted on the frame member 201 before it is inserted into the cargo bed of the truck.

For sanitation purposes, a hand pump-operated sink 203 is included along with an insulated tank 205 for supplying hot water to the sink 203. The sink 203 drains into a waste water tank under the oven (not shown). The waste water tank includes an outlet and valve for draining the waste water at the appropriate location. A bottle of hand soap 204 is preferably mounted on the oven side of the dividing wall 49. Paper towels are held on a dispenser 208 attached to the control panel of the oven. As another sanitary measure, disposable plastic gloves can be used by the drivers when handling the pizzas and ingredients.

The frame member 201 also preferably includes a bracket 209 for storing medium and large flat pizza boxes 211.

Figure 22:
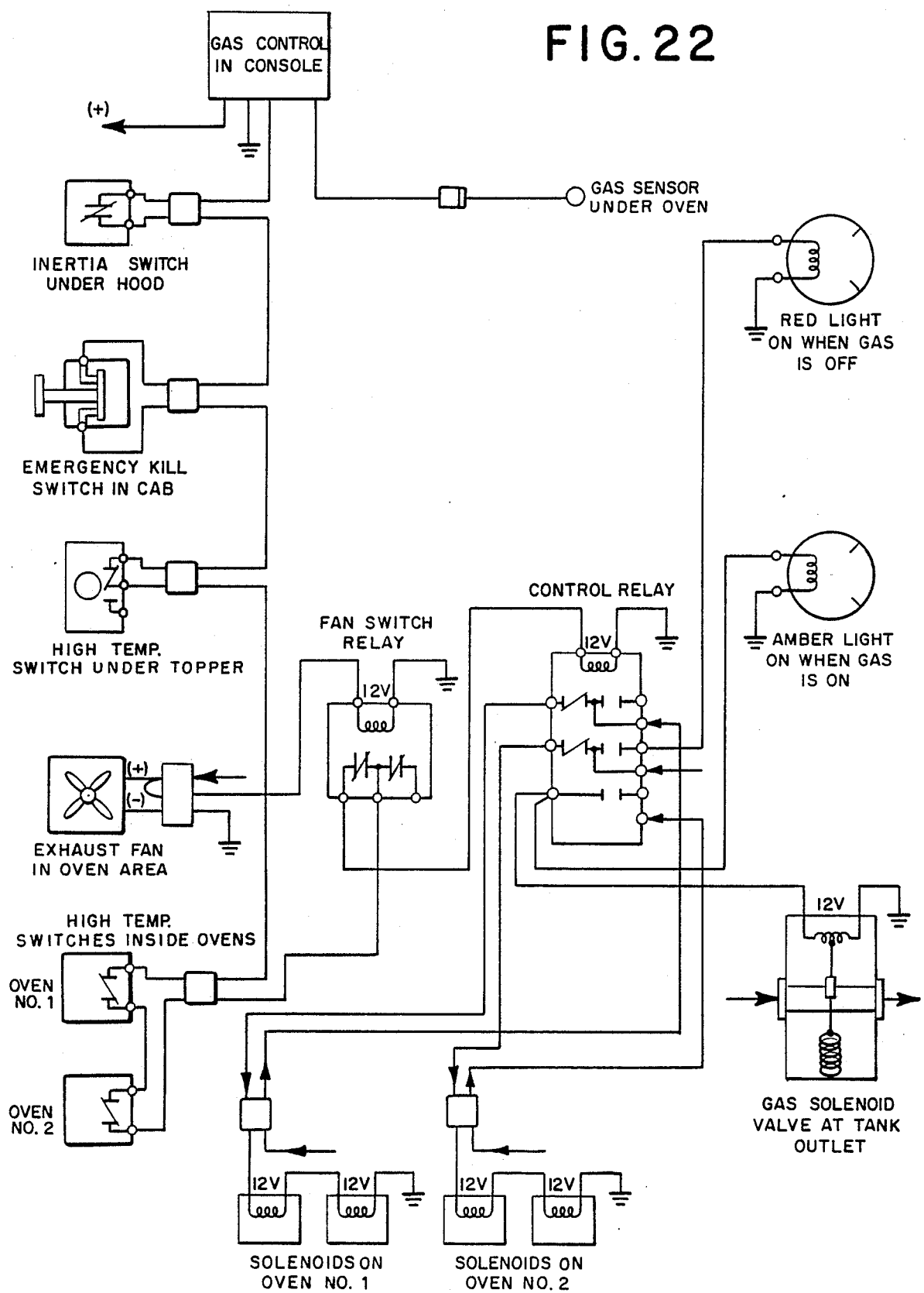
FIG. 22 is a schematic wiring diagram of the safety system of the vehicle shown in FIG. 1.

FIG. 22 is a schematic wiring diagram illustrating the preferred safety system for the vehicle. The inventions embodied in this safety system are described and claimed in a co-pending U.S. patent application Ser. No.

07/259,041 filed on the same day and assigned to the same assignee as the present application.

Starting at the bottom right side of the diagram, the system includes a solenoid operated valve at the outlet of the fuel tank. This valve is mechanically closed unless the solenoid is activated with 12 volts. Solenoid operated valves are also included for each of the two oven units. Like the valve at the fuel tank outlet, these valves are mechanically closed and opened only if the solenoids are activated with 12 volts. As a consequence, the gas is shut off from the outlet of the fuel tank, and the gas to the ovens is shut off, if the power circuit is opened by one of the following safety devices.

Moving now to the top of the diagram, the safety system includes a gas control unit in the console of the cab which is connected to a gas sensor located 2" above the floor of the cargo bed on the oven support leg nearest the burners for the oven. The gas control normally supplies 12 volts to the rest of the system when no gas is detected. However, because the power output of the control is insufficient to power the remaining components of the safety system, a control relay is preferably added. If gas is detected, the control supplies 0 volts to the control relay and the valves at the outlet of the fuel tank and ovens are automatically, mechanically shut. Preferably, the gas sensor, control, and solenoid are purchased as a set from the Newtec Co.

The system also includes an inertia switch under the hood of the pickup. This switch is designed to shut off the power in the event of sudden impact, i.e. a collision, or inverted position, i.e. rollover. As stated above, the valves at the fuel tank and ovens automatically close when the power is shut off anywhere in the system.

An emergency kill switch is provided for the driver on the dash of the vehicle. Preferably, this switch is clearly labeled, lighted, and must be pulled out before the oven can be operated.

A high temperature sensor is included on the underside of the topper in the oven compartment. Preferably, this sensor is set to open the circuit if the temperature inside the topper reaches about 250° F.

High temperature switches are also included within each of the two oven chambers. Preferably, these switches are set to open the main power circuit if the temperature in either oven chamber exceeds about 625° F., i.e. a preset temperature about 100° F. above the normal operating temperature of the oven.

An exhaust fan is included in the topper to exhaust the oven compartment through ventilation port 21 (see FIG. 2). The circuit is designed so that the fan always runs when the oven is on. If this fan loses power, the relay also closes the solenoids at the fuel tank and ovens.

Indicator lights are provided for the driver to see the status of the safety system. A red light is adapted to be turned on whenever the gas has been shut off. An amber light is adapted to be turned on whenever the gas is flowing.

FIGS. 23-34 illustrate the pizza oven 45 used in the most preferred embodiment of the present invention. The inventions embodied in this oven are described and claimed in a co-pending U.S. patent application Ser. No. 07/258,967 filed on the same day and assigned to the same assignee as the present application.

Figure 23:
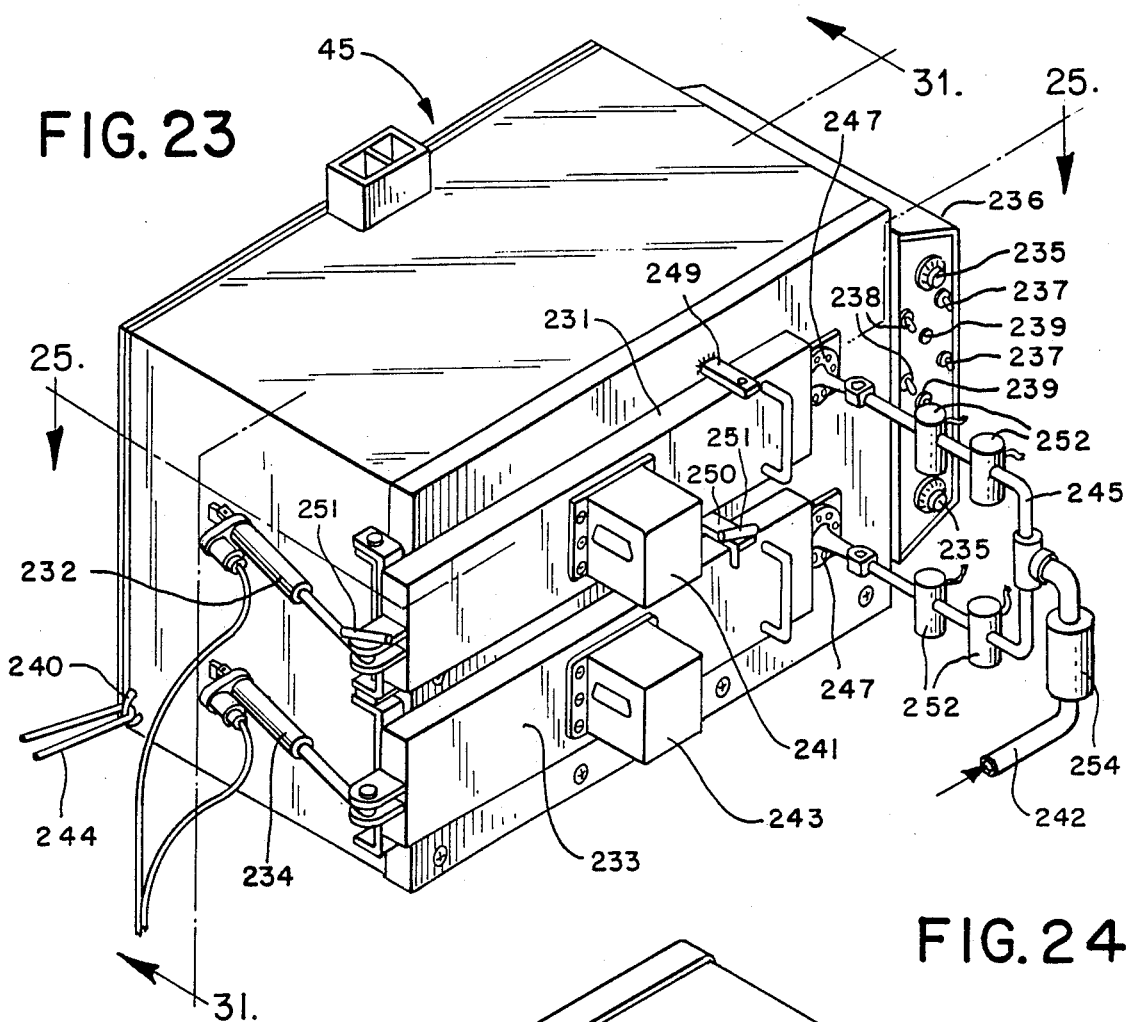
FIG. 23 is a perspective view of the front and side of the double oven used in the vehicle shown in FIG. 1.

FIG. 23 is a perspective view showing the front and top of the preferred oven 45. As can be seen, the oven 45 is a dual oven, i.e. includes a top and a bottom oven unit. The dual oven 45 is mounted to the frame member supports 199 with shock mounts to decrease the road vibration transmitted to the oven.

As shown, the top and bottom oven unit each have a door 231 and 233 respectively. These doors are preferably operated by actuators 232 and 234 respectively. Mounted on each of the doors is a motor housing 241 and 243.

In the event of door actuator or oven controller failure, the actuator pivot pin 251 can be removed from its location on the actuator and the door then opened. The same pin 251 can then be inserted into the hole 250 above the oven door to hold the door closed during the baking cycle.

On the left side of the oven is a control panel 236. Preferably, the controls are mounted to the side of the oven with rubber grommets and so that a gap is left between the two. In this way, the controls are subjected to less vibration and heat from the oven. The controls include toggle switches 237 for each of the blower motors and toggle switches 238 for each of the burners. A temperature control dial 235 and a "burner on" indicator light 239 are also included for each oven unit.

Gas line 242 brings gas from the fuel tank and through a filter 254. The line is then split into lines 245 which pass through the 2 solenoid operated valves 252 on each line. As mentioned above, the valves 252 are designed to be mechanically closed when not receiving a 12 volt signal.

A tie-down loop 240 is attached to the side of the oven and a cable 244 is attached to the frame of the pickup to thus restrain the oven from moving forward in the event of a crash.

Figure 24:
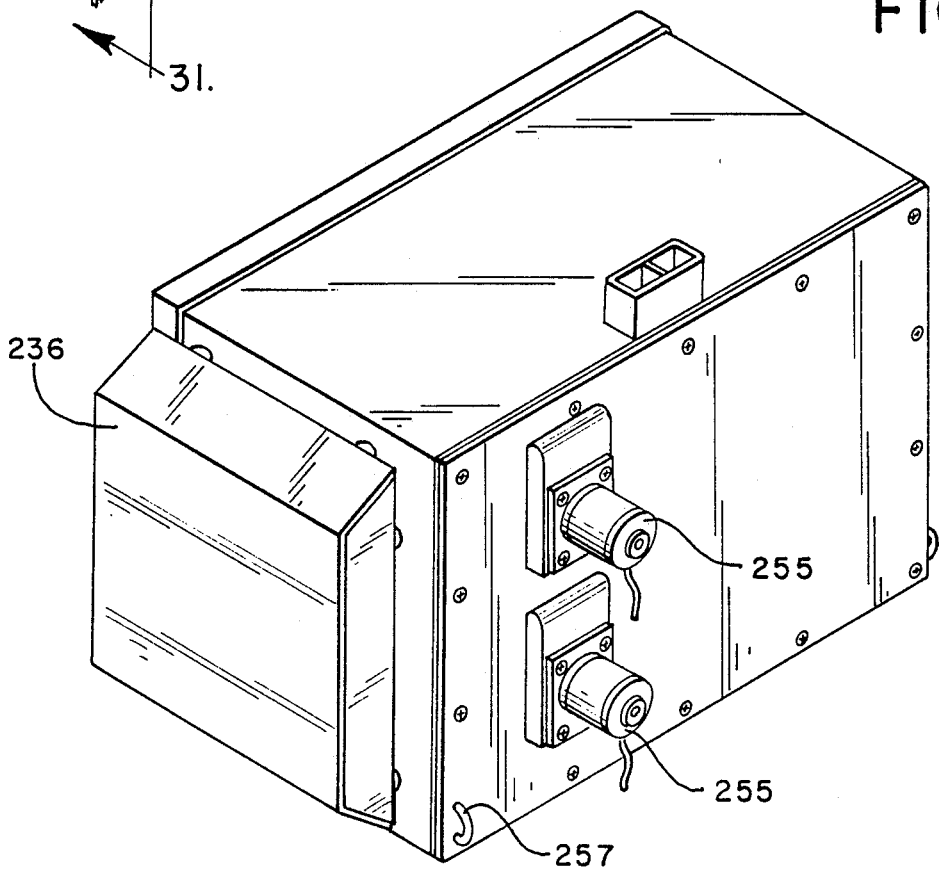
FIG. 24 is a perspective view of the rear and side of the oven shown in FIG. 23.

FIG. 24 is a perspective view showing the back of the preferred oven 45. As can be seen, the blower motors 255 project from the rear of the oven. Another tie-down loop 257 is included on the rear of the oven.

Figure 25:
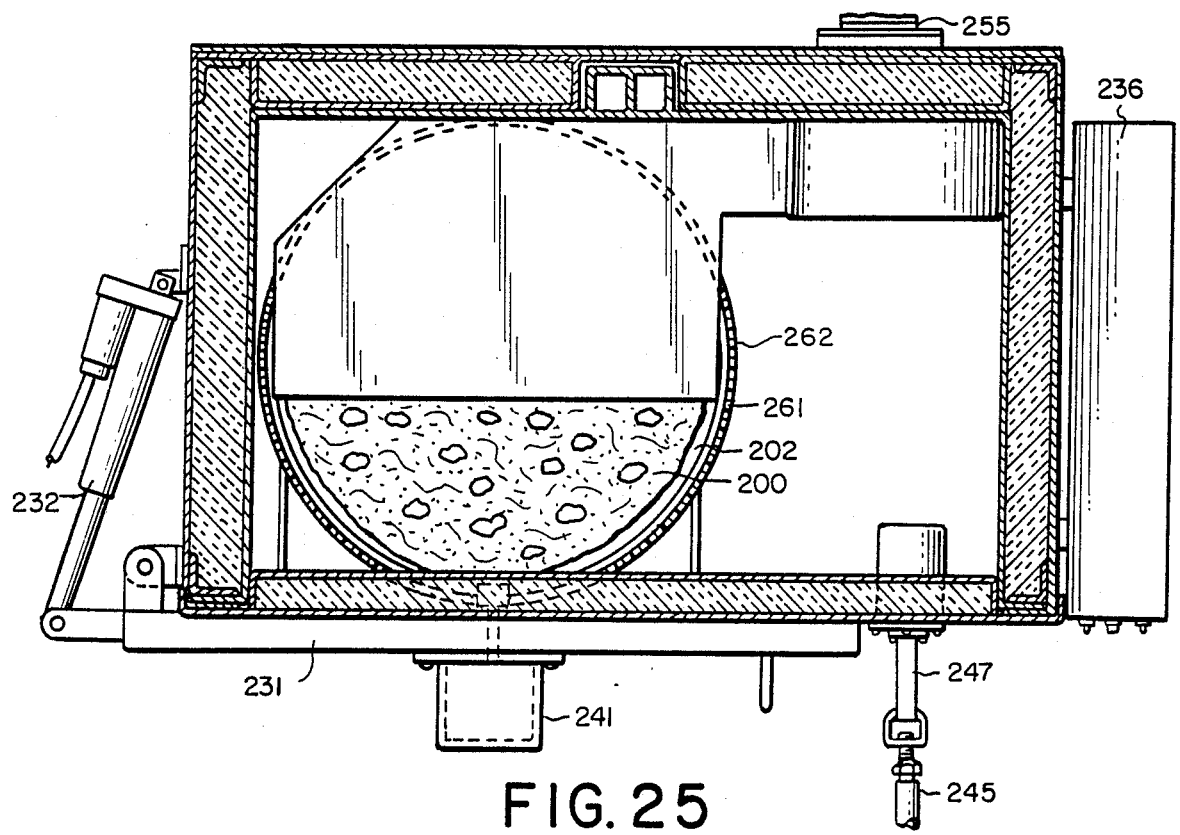
FIG. 25 is a cross-sectional view taken along line 25—25 of FIG. 23.
Figure 26:
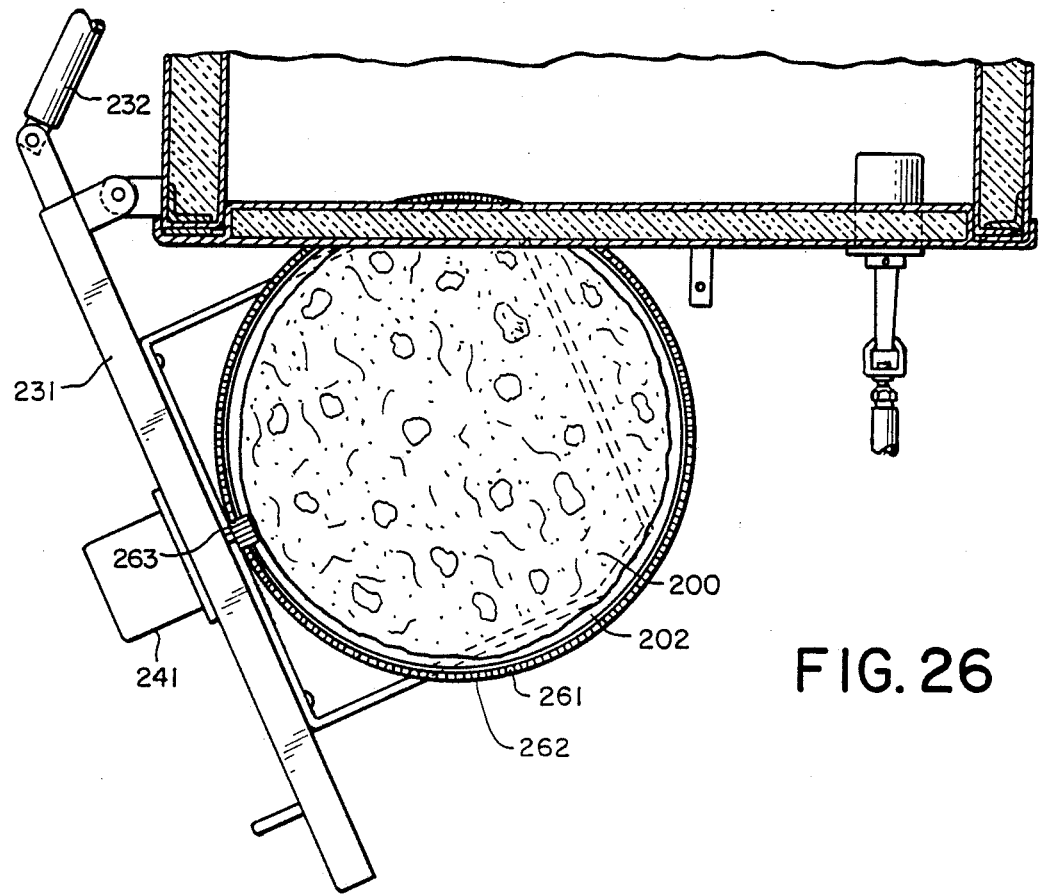
FIG. 26 is a view similar to FIG. 25 which shows the oven door open.
Figure 27:
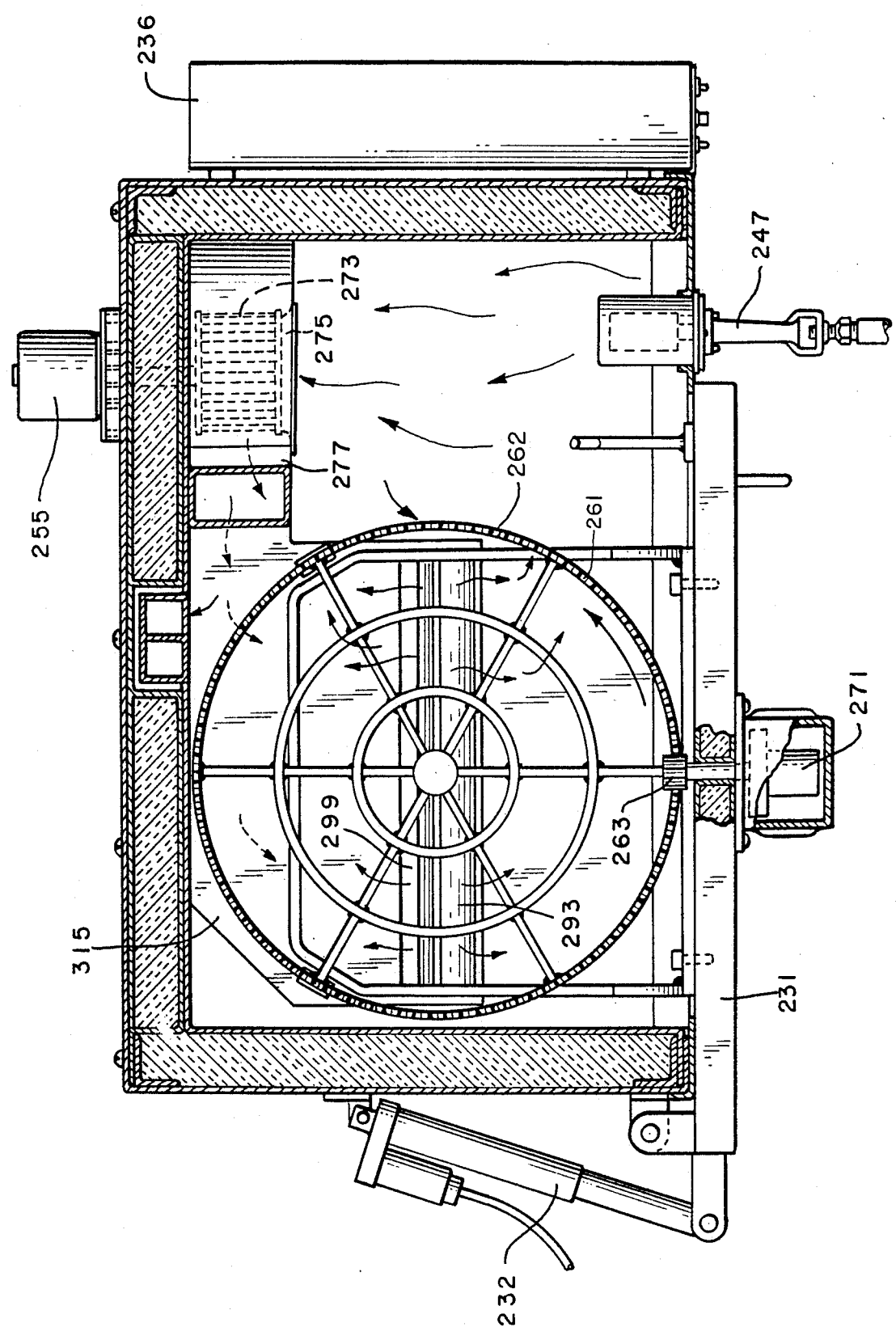
FIG. 27 is view similar to FIG. 25 showing the flow of air through the oven.
Figure 28:
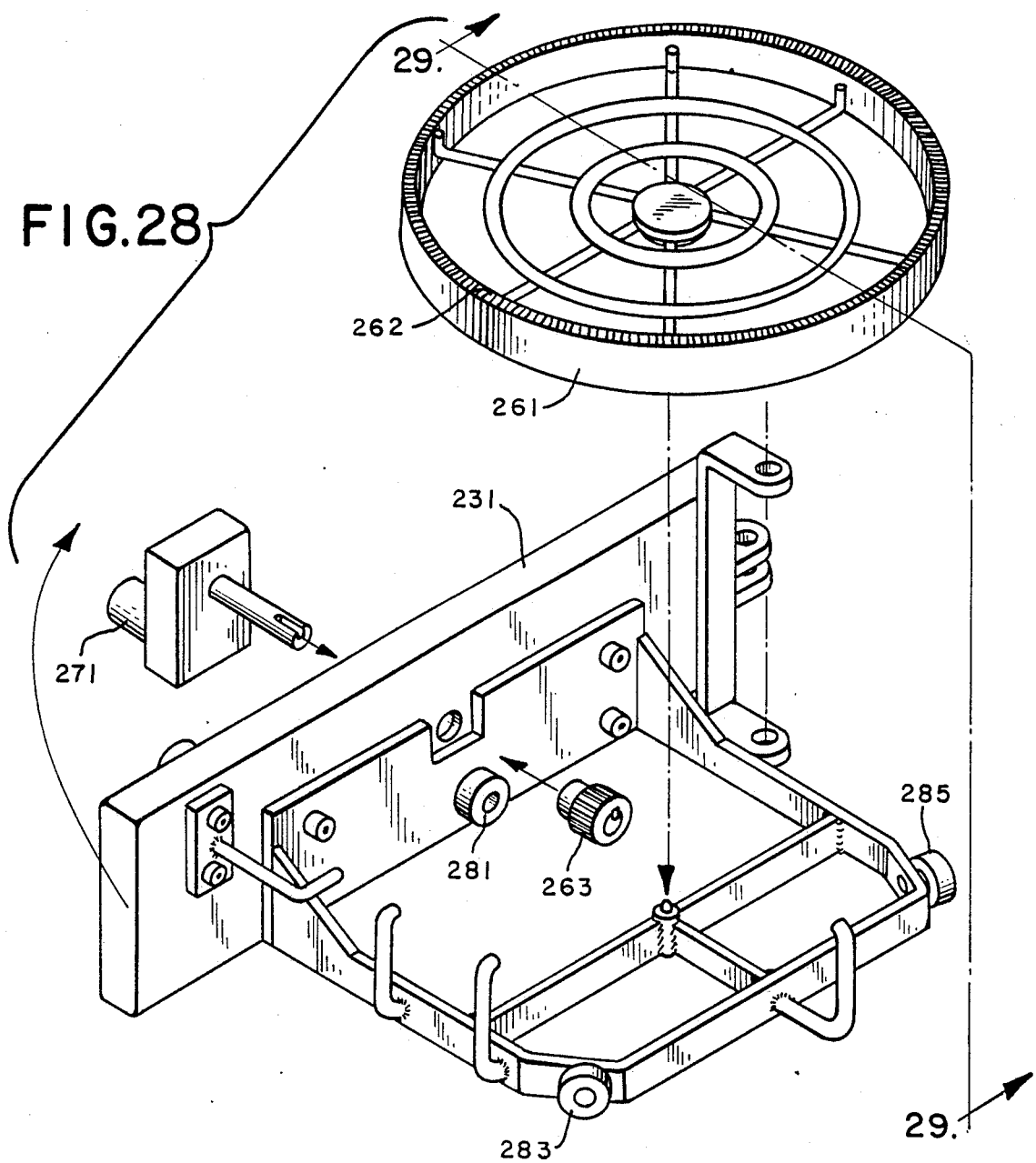
FIG. 28 is an exploded view of the oven door, the turntable and turntable motor for the oven of FIG. 23.
Figure 29:
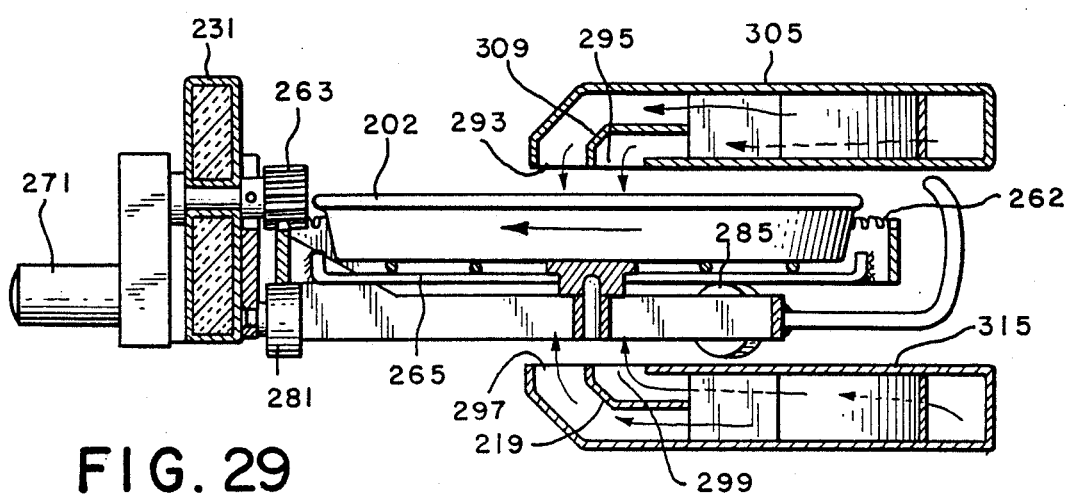
FIG. 29 is a cross-sectional view along lines 29—29 of FIG. 28, of the turntable, oven door, and plenums.

FIG. 25 is a cross-sectional view from the top of the oven through line 25—25 of FIG. 23. FIG. 26 is a similar view but with the door 231 swung open. Referring also to FIGS. 27 and 28, it is seen that a turntable 261 is attached to the door 231 so that the turntable is brought out of the oven chamber when the door 231 is opened. This turntable 261 is adapted to support the pizza 200 in the pan 202 during baking.

The turntable is adapted to rotate the pizza 200 during the baking cycle. This is preferably accomplished by means of an outer ring 262 which includes gear teeth to engage the driven gear 263. The gear 263 is driven by the motor 271. The underside of the outer ring 262 is adapted to roll on top of the wheels 281, 283 and 285. These wheels are preferably made of "rulon" so as to withstand the intense heat generated within the oven chamber. The motor is preferably set at a speed so as to rotate the turntable twice a minute.

FIGS. 27 and 29–31 illustrate the flow of heated air through the oven 45. As shown in FIG. 27, air is heated by the gas burner 247. That heated air is drawn through the inlet cone 275 into the volute 277 by the blower wheel 273. Preferably, the blower wheel is rotated at a speed of between about 2200 and about 2300 rpm so as to create a high velocity.

The air is impelled from the volute 277 into a air splitting plenum 301. Within the plenum 301 is a tongue 303 which divides the air between the top and bottom plenums 305 and 315 respectively. The air that passes into the top plenum 305 is then divided by a vane 307. The air passes out of the top plenum 305 through two slots 293 and 295 which are separated by a tongue 309.

After passing through the slots 293 and 295, the air impinges on the top surface of the pizza 200. In similar fashion, the air that passes into the bottom plenum 315 is divided by a vane 317. The air passes out of the bottom plenum 315 through two slots 297 and 299 which are separated by a tongue 219.

Figure 32:
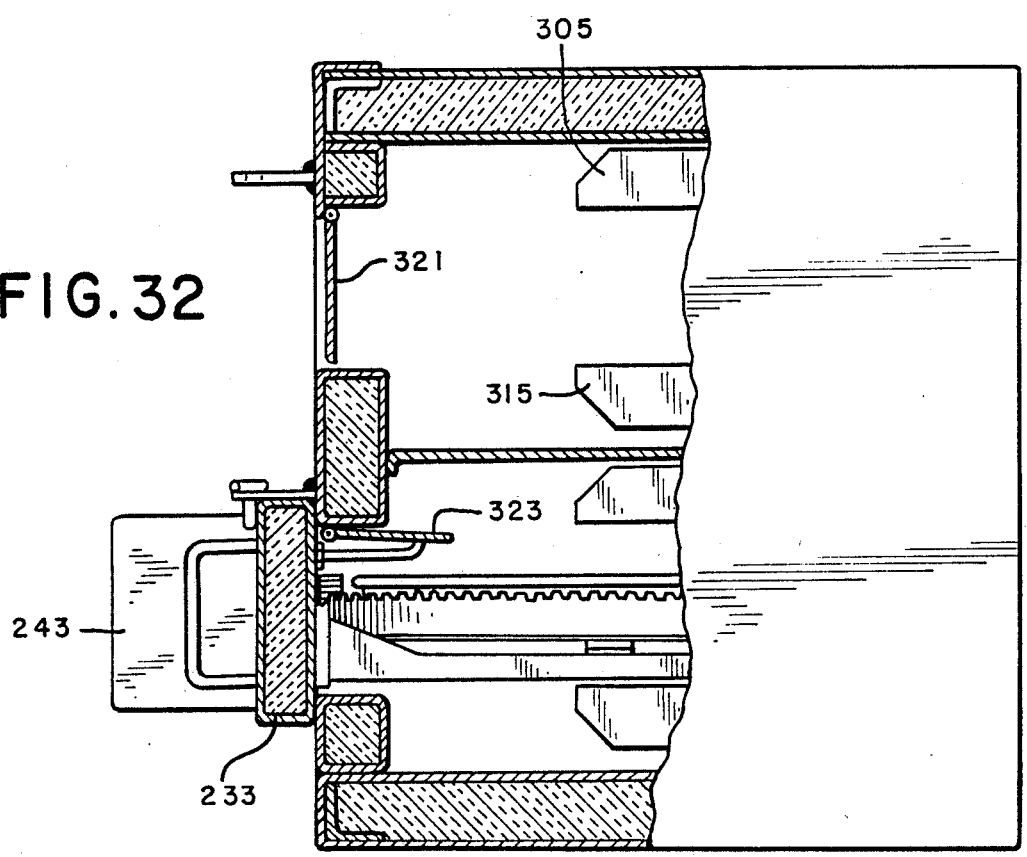
FIG. 32 is a partial cross-sectional view showing the oven closing plate.

FIG. 32 illustrates an energy saving and air balancing feature of the preferred oven 45. In this figure, the top door is open and the turntable is out of the oven chamber. In this condition, a hinged plate 321 is allowed to swing down and block the opening to the oven chamber. As shown with the lower door 233, when the door is closed and the turntable pushed back into the oven chamber. the hinged plate 323 is pushed up and out of the way. In this way, the oven chamber is kept closed and the amount of secondary air to the burner flame is kept fairly constant.

Figure 33:
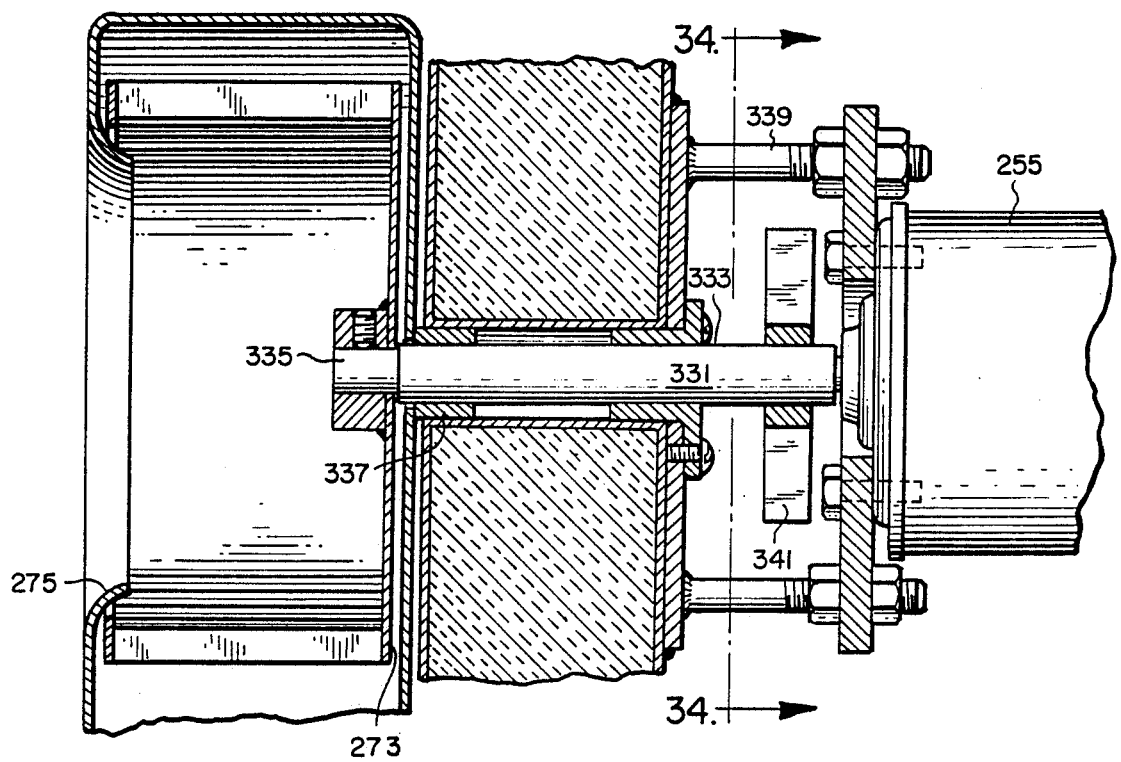
FIG. 33 is a cross-sectional view showing the fan motor, shaft, and blower wheel.
Figure 34:
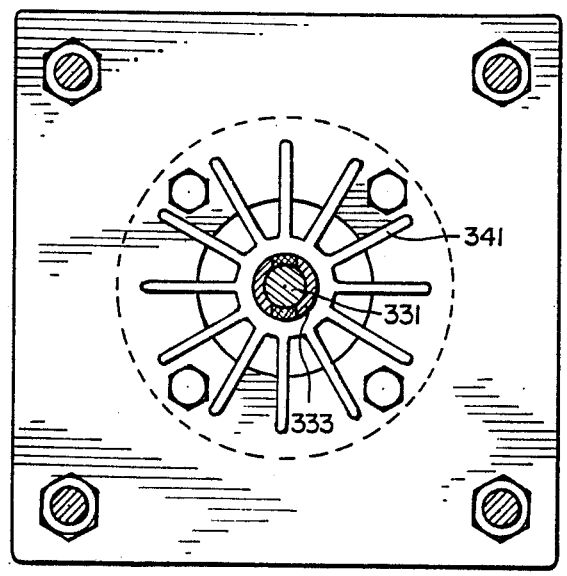
FIG. 34 is a cross-sectional view taken along line 34—34 of FIG. 33.

FIG. 33 is a cross-sectional view illustrating the configuration of the blower and motor shafts. In particular, the motor 255 is separated from the back of the oven by bolts 339. The motor shaft 331 is attached to the blower wheel hub 335. The shaft passes through a bushing 337. Attached to the extension shaft is a heat slinger 341 shown also in FIG. 34. The function of the heat slinger is to dissipate heat off of the shaft to avoid passing heat to the motor 255.

Certainly, one of the challenges of providing a compact pizza preparation and delivery vehicle was that of producing a suitable pizza oven. In particular, it was necessary to provide an oven which took up little space, required little electric power, and provided for optimum baking of the pizzas. The oven described herein is such an oven. The peak operating power demand, i.e. when both ovens are baking, is about 20 amps at 12 volts. The fact that the pizza is brought out of the oven when the oven door is opened is fortunate for two reasons. First, it allows for easier access for the driver. That is, the driver can simply place the pizza pan on the turntable rather than trying to slide the pan through an oven door. Second, because the pizza is brought out of the oven when the door opens automatically, the pizza cannot be overbaked because the driver is busy in traffic or away from the vehicle making a delivery at the completion of the baking cycle.

It was also a challenge to provide a small oven which could provide uniformly baked pizzas as well as consistency between pizzas. It was somewhat surprising that the slots such as used in the preferred embodiment would provide uniformly cooked pizzas. In particular, because the slots pass over the center of a rotating pizza, it was thought that the center of the pizza would be overbaked. That is, it was thought that since the center section of the pizza spends more time under the slots, it would be overbaked in the time it would take to bake the outer sections of the pizza. In experimentation, it was found that pizzas baked in an oven similar to that depicted—except that the vanes 307 and 317 were in the center of the top plenum and bottom plenums did show overbrowning on the top layer of cheese. However, it was found that pizzas cooked in this same oven were baked uniformly on the bottom.

It is currently believed that this uniformity of bottom baking is related to the fact that the center section of the pizza is the hardest section to get fully baked. This is because the center of the pizza is surrounded by the rest of the pizza and is further from the side of the heat conducting pizza pan. As a result, the center is the last section to be fully heated. This is why the center sections of pizzas cooked in conventional ovens are typically checked for doneness. Apparently, the oven of the preferred embodiment accomplishes a desirable balance between the center section spending more time over the slots and the center section being more difficult to bake. Whatever the reasons, it is fortunate that the oven provided for uniform bottom cooking in such a small space.

In connection with the overbrowning noted with respect to the top layer of cheese, it was found that this could be corrected through the use of a vane such as the one shown at 307. As can be seen, the leading portion 306 of the vane 307 splits the air column as it enters the top plenum 305. The vane then makes a 45° turn to the second portion of the vane 308, followed by another 45° turn to the third portion of the vane 310. This third portion of the vane 310 is located on the volute side of the center of the slot. In particular, this portion 310 is preferably 1.0" off of center. This bending of the air column in front of the vane, coupled with the fact that the air behind the third portion 310 of the vane does not bend as dramatically, produces an area 312 of reduced air pressure, i.e. a "shadow", behind the third portion 310. This reduced air pressure has been found to compensate for the greater amount of time the center section of the top cheese layer spends under column of heated air. As a result, pizzas cooked in the depicted oven, i.e. with the vane 307, have not shown overbrowning at the center section.

Figure 30:
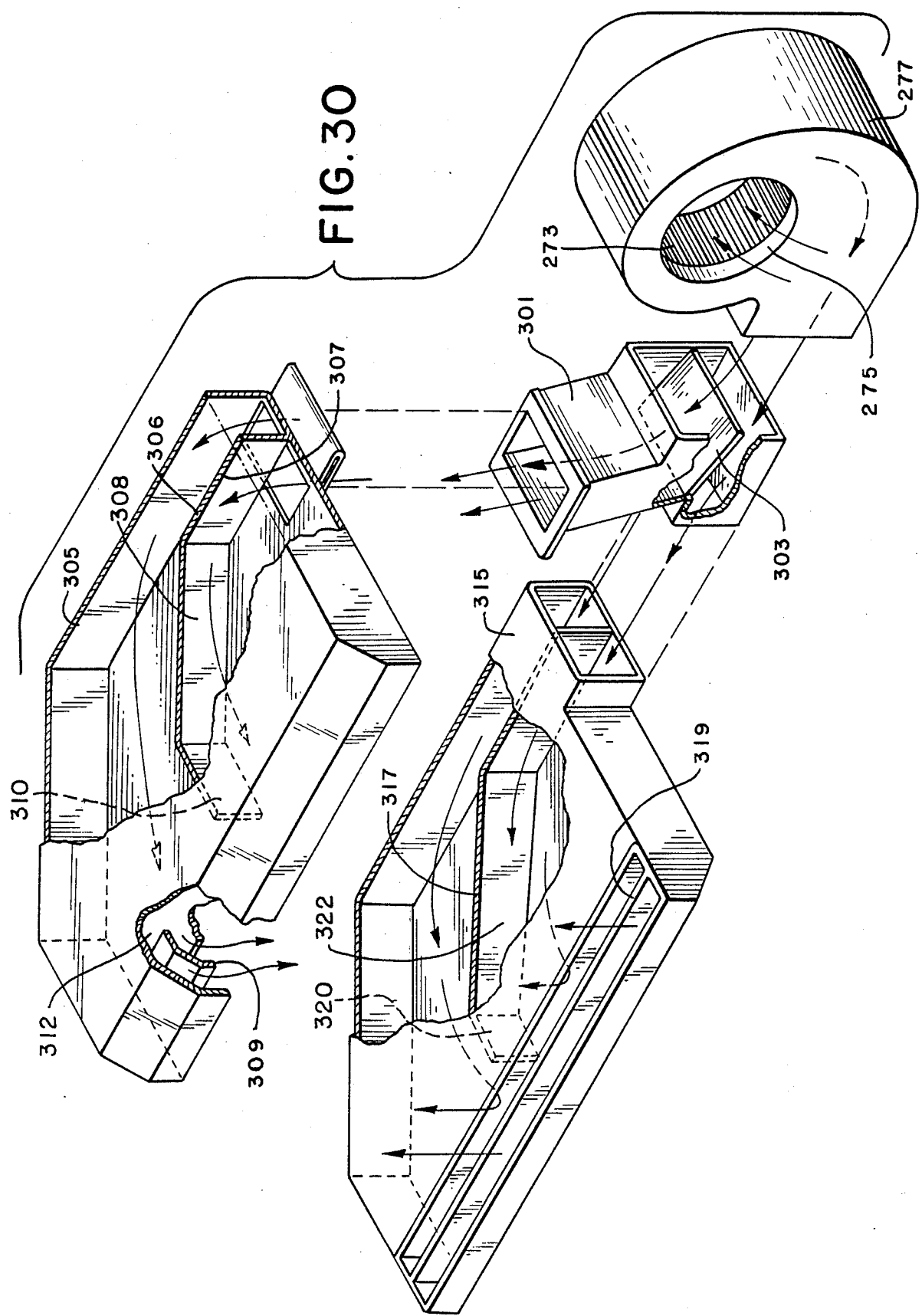
FIG. 30 is an exploded view showing the flow of air through the blower, ducts, and slots of the oven shown in FIG. 23.
Figure 31:
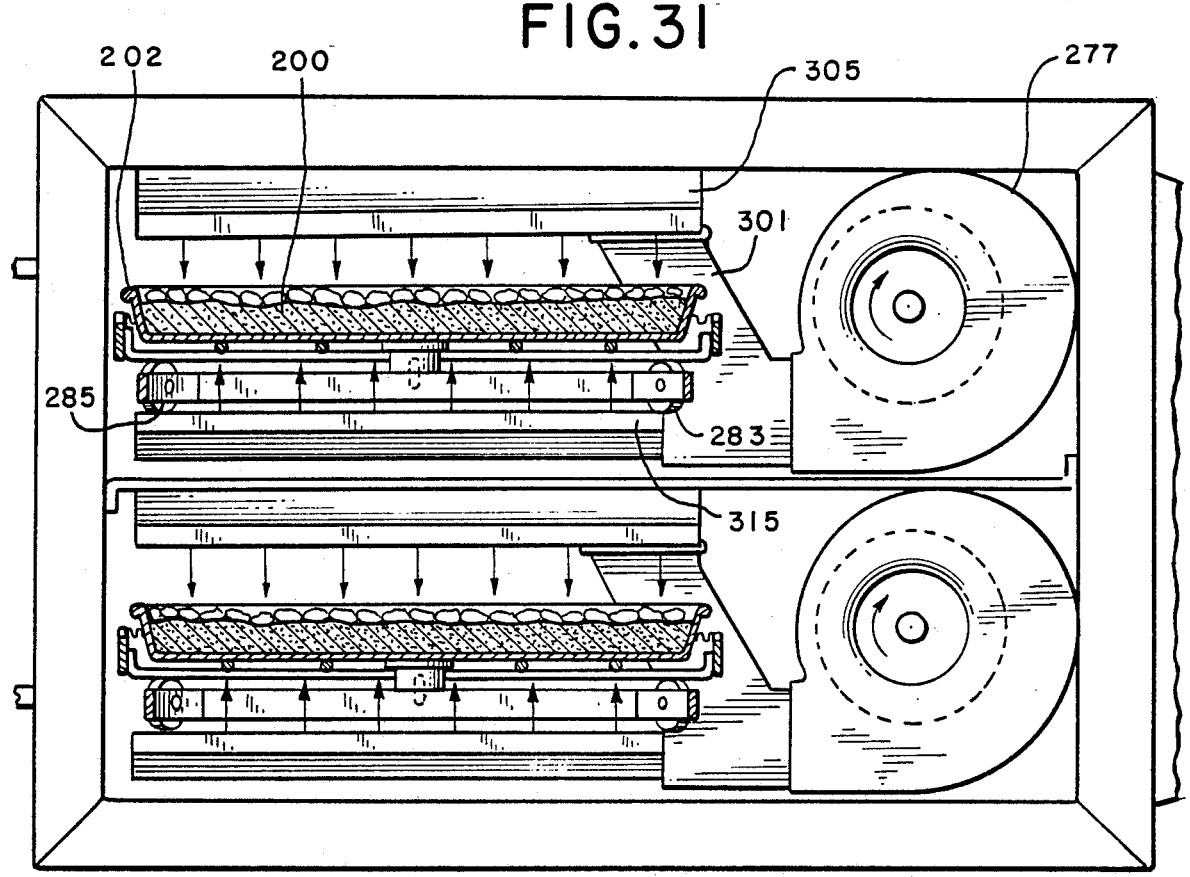
FIG. 31 is a cross-sectional view taken along line 31—31 of FIG. 23.

As seen in FIG. 30, the bottom plenum also includes a vane 317. In this case, the vane 317 is used to create an area 322 of increased air pressure under the center of the pizza pan. In particular, the third portion 320 of the vane 317 has been located at the center of the slot. As a result, higher air pressure is created in the area 322. This has been found to be preferable so that even more heat can be directed toward the bottom center of the pizza during cooking.

It should be noted that although much of the discussion has involved the modification of a mini-pickup truck, other types of vehicles can also be used. For example, mini-vans can also be used in the present invention. Certainly, a prominent factor in the choice of the vehicle is the economy at which it can be purchased equipped, operated, maintained, and resold. Certainly, these and all other modifications which are within the ordinary skill in the art to make are considered to lie within the scope of the invention as defined by the appended claims.

I claim:

1. A compact pizza preparation and delivery vehicle comprising:
   a self-propelled vehicle comprising a driver's compartment with a driver's seat and a cargo compartment behind the driver's compartment;
   a refrigerated case located in the driver's compartment within access of a driver in the driver's seat for storing pizza shells and pizza toppings;
   an assembly table located on top of the refrigerated case upon which a pizza shell is placed while pizza toppings are applied thereto;
   a pizza oven in the cargo compartment which is adapted and positioned so that, while sitting in the driver's seat, a driver can insert an unbaked assembled pizza into the oven and remove a baked pizza from the oven.

2. The vehicle of claim 1 further comprising oven controller means including a timer means for setting a proper baking cycle for each pizza.

3. The vehicle of claim 1 further comprising means for receiving pizza delivery orders from a base station while the vehicle is in transit.

4. The vehicle of claim 3 wherein the means for receiving pizza delivery orders comprises means for receiving radio signals, and means for converting said radio signals into a printed pizza delivery order.

5. The vehicle of claim 4 wherein the pizza delivery order includes a specification of pizza size and choice of toppings together with a customer address.

6. The vehicle of claim 4 wherein the means for receiving pizza delivery orders further comprises means for voice communication between the vehicle and the base station.

7. The vehicle of claim 1 further comprising means for receiving pizza delivery orders directly from customers while in transit.

8. The vehicle of claim 7 wherein the means for receiving pizza delivery order directly from customers comprises a cellular phone.

9. The vehicle of claim 1 further comprising a supplemental refrigerated case in the cargo compartment for storing additional pizza shells and toppings.

10. The vehicle of claim 1 wherein the refrigerated case in the driver's compartment is cooled by a compressor located in the cargo compartment.

11. The vehicle of claim 1 wherein the refrigerated case in the driver's compartment comprises a toppings drawer divided into sections to hold various pizza toppings, said drawer being adapted to be moved from a first position wherein the pizza toppings are within the refrigerated case and a second position toward the driver wherein the pizza toppings are out of the refrigerated case and are within reach of the driver in the driver's seat.

12. The vehicle of claim 11 wherein the refrigerated case in the driver's compartment includes a first door whereby the driver in the driver's seat can remove pizza shells from the refrigerated case.

13. The vehicle of claim 12 wherein the vehicle further comprises a passenger door and wherein the refrigerated case in the driver's compartment includes a second door which is accessible from the passenger door.

14. The vehicle of claim 1 wherein the pizza oven comprises:
a baking chamber;
means for heating air;
fan means for impelling heated air;
an oven door;
a turntable upon which the pizza is rotated about its center;
at least one upper slot in the baking chamber through which heated air is impelled toward the top of the pizza as it is rotated on the turntable; and
at least one bottom slot in the baking chamber through which heated air is impelled toward the bottom of the pizza as it is rotated on the turntable.

15. The vehicle of claim 14 wherein the length of the upper slot is substantially equal to the diameter of the turntable and wherein the midpoint of the upper slot is generally above the center of the turntable.

16. The vehicle of claim 14 wherein the oven door is hinged on a vertical side of the door wherein the turntable is connected to the door whereby the turntable is brought out of the baking chamber when the door is swung open.

17. The vehicle of claim 16 wherein the turntable is powered by a motor located on the oven door.

18. The vehicle of claim 16 wherein the oven further comprises a closing plate hingedly attached above the oven door, which closing plate is adapted to swing down and close the baking chamber when the oven door is swung open and is adapted to be pushed open when the oven door is swung closed.

19. The vehicle of claim 14 further comprising oven controller means including a timer means for setting a proper baking cycle for each pizza.

20. The vehicle of claim 19 wherein the oven controller means further comprises energy saver means for switching the fan means from an idle speed to a faster baking speed at the beginning time of the baking cycle, and for switching the fan means back to the idle speed at the end of the baking cycle.

21. The vehicle of claim 20 wherein the energy saver means further includes means for switching the turntable on at the beginning of the baking cycle, and for switching the turntable off at the end of the baking cycle.

22. The vehicle of claim 19 wherein the pizza oven further comprises actuating means for automatically opening the oven door in response to a signal generated by the oven controlling means.

23. The vehicle of claim 14 wherein the pizza oven further comprises actuating means for automatically opening the oven door.

24. The vehicle of claim 1 wherein the pizza oven comprises:
a first and second baking chamber;
first and second fan means for impelling heated air in the first and second baking chamber respectively;
a first and second oven door;
a first and second turntable upon which pizzas are rotated about their center;
at least one upper slot in the first baking chamber through which heated air is impelled toward the top of a first pizza as it is rotated on the first turntable;
at least one bottom slot in the first baking chamber through which heated air is impelled toward the bottom of the first pizza as it is rotated on the first turntable
at least one upper slot in the second baking chamber through which heated air is impelled toward the top of a second pizza as it is rotated on the second turntable; and
at least one bottom slot in the second baking chamber through which heated air is impelled toward the bottom of the second pizza as it is rotated on the second turntable.

25. The vehicle of claim 24 wherein the first baking chamber is located above the second baking chamber.

26. The vehicle of claim 1 wherein the vehicle is a pickup truck with a cargo bed that is covered by a topper to form the cargo compartment.

27. The vehicle of claim 26 further comprising fan means for venting the cargo compartment to the outside.

28. The vehicle of claim 26 further comprising wall means for dividing the cargo compartment into an oven compartment and a refrigerated case compartment.

29. The vehicle of claim 28 further comprising first fan means for venting the oven compartment and second fan means for venting the refrigerator compartment.

30. A compact pizza preparation and delivery vehicle comprising:

a pickup truck comprising a driver's compartment with a driver's seat, a cargo bed behind the driver's compartment, an engine; and a battery and alternator for supplying electrical power to the engine;

means for receiving pizza delivery orders while in transit;

a topper to cover the cargo bed and form a cargo compartment;

a refrigerated case located in the driver's compartment within access of a driver in the driver's seat for storing pizza shells and pizza toppings;

an assembly table located on top of the refrigerated case upon which an uncooked pizza shell is placed while pizza toppings are applied thereto;

a pizza oven in the cargo bed which is adapted and positioned so that, while sitting in the driver's seat, a driver can insert an unbaked assembled pizza into the oven and remove a baked pizza from the oven and wherein the pizza oven comprises:

a baking chamber;

fan means for impelling heated air;

an oven door;

a turntable upon which the pizza is rotated about its center;

at least one upper slot in the baking chamber through which heated air is impelled toward the top of the pizza as it is rotated on the turntable; and at least one bottom slot in the baking chamber through which heated air is impelled toward the bottom of the pizza as it is rotated on the turntable; and oven controller means including a timer means for setting a proper baking cycle for each pizza.

31. The vehicle of claim 30 wherein the oven is heated by gas and the electrical power needs of the refrigerated case and the oven are met by the battery and alternator for the engine.

32. The vehicle of claim 30 further comprising a supplemental battery connected to the alternator and wherein the oven is heated by gas and the electrical power needs of the refrigerated case and the oven are met by the battery, the supplemental battery and the alternator for the engine.

33. The vehicle of claim 30 further comprising a supplemental refrigerated case located in the cargo compartment for storing additional pizza shells.

34. The vehicle of claim 33 wherein the oven, the supplemental refrigerated case, and a common compressor are affixed to a common frame member which member is attached to the cargo bed of the truck.

35. The vehicle of claim 30 wherein the refrigerated case in the driver's compartment is cooled by a compressor located in the cargo compartment.

* * * * *